United States Patent [19]
Younger

[11] Patent Number: 5,540,628
[45] Date of Patent: Jul. 30, 1996

[54] METHODS AND SYSTEMS FOR IMPROVING THE OPERATION OF TRANSMISSIONS FOR MOTOR VEHICLES

[76] Inventor: Gilbert W. Younger, 2621 Merced Ave., El Monte, Calif. 91733

[21] Appl. No.: 333,552

[22] Filed: Nov. 2, 1994

[51] Int. Cl.⁶ ........................................... F16H 3/62
[52] U.S. Cl. .......................... 475/120; 475/127; 475/128; 477/130; 477/137
[58] Field of Search ................................ 475/118, 120, 475/122, 127, 128; 477/127, 130, 137

[56] References Cited

U.S. PATENT DOCUMENTS

| | | | |
|---|---|---|---|
| 3,938,410 | 2/1976 | Dach et al. | 477/130 X |
| 4,513,640 | 4/1985 | Stevenson | 477/127 |
| 5,109,733 | 5/1992 | Ishikawa et al. | 475/120 |
| 5,109,734 | 5/1992 | Fujiwara | 475/127 |
| 5,334,114 | 8/1994 | Ando et al. | 475/120 X |
| 5,342,253 | 8/1994 | Mizobe et al. | 475/128 |

*Primary Examiner*—Charles A. Marmor
*Assistant Examiner*—Peter Kwon
*Attorney, Agent, or Firm*—Mark P. Stone

[57] ABSTRACT

The present invention is directed to methods and systems for improving the operation of a transmission for an automotive vehicle, and in particular the transmission as installed by the original automobile manufacturer. The methods and systems of the present invention modify the original hydraulic fluid circuits of the automotive transmission provided by the automobile manufacturer to enable the transmission to select any available ratio at any time, and to enable the transmission to produce quick applies and releases for racing applications with only minimum ratio sharing or overlap. The modification of the original automotive transmission to achieve these goals includes adjustment of the hydraulic fluid circuits by providing a new low control valve, by providing new hydraulic flow circuits, by discontinuing use of existing hydraulic circuits, by enlarging the size of pre-existing orifices and by plugging other orifices, and by adjusting pre-existing spring and pressure values; all of which adjust the fluid flow and operation of the original factory installed automotive transmission in accordance with the basic objectives of the present invention.

21 Claims, 12 Drawing Sheets

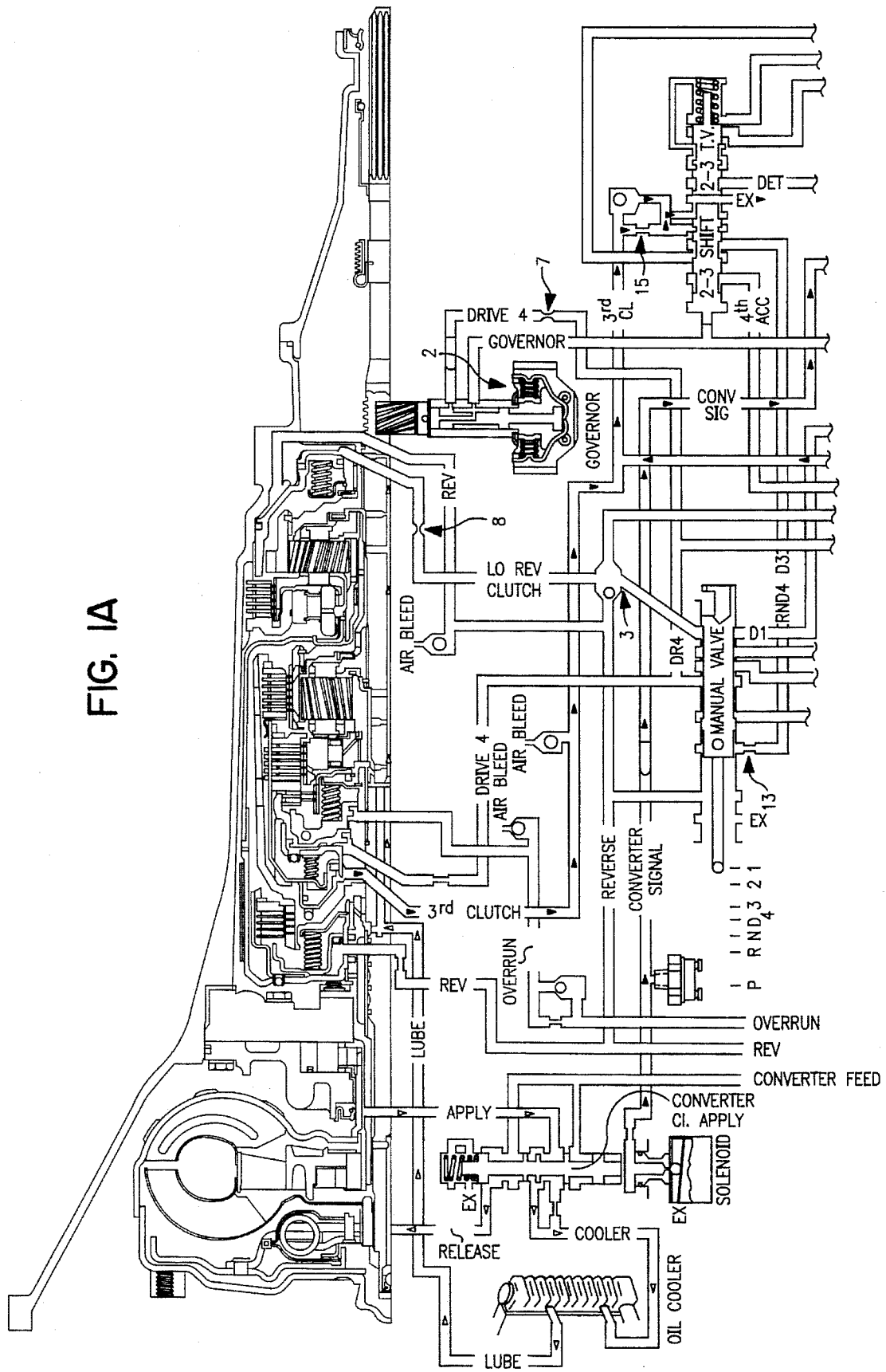

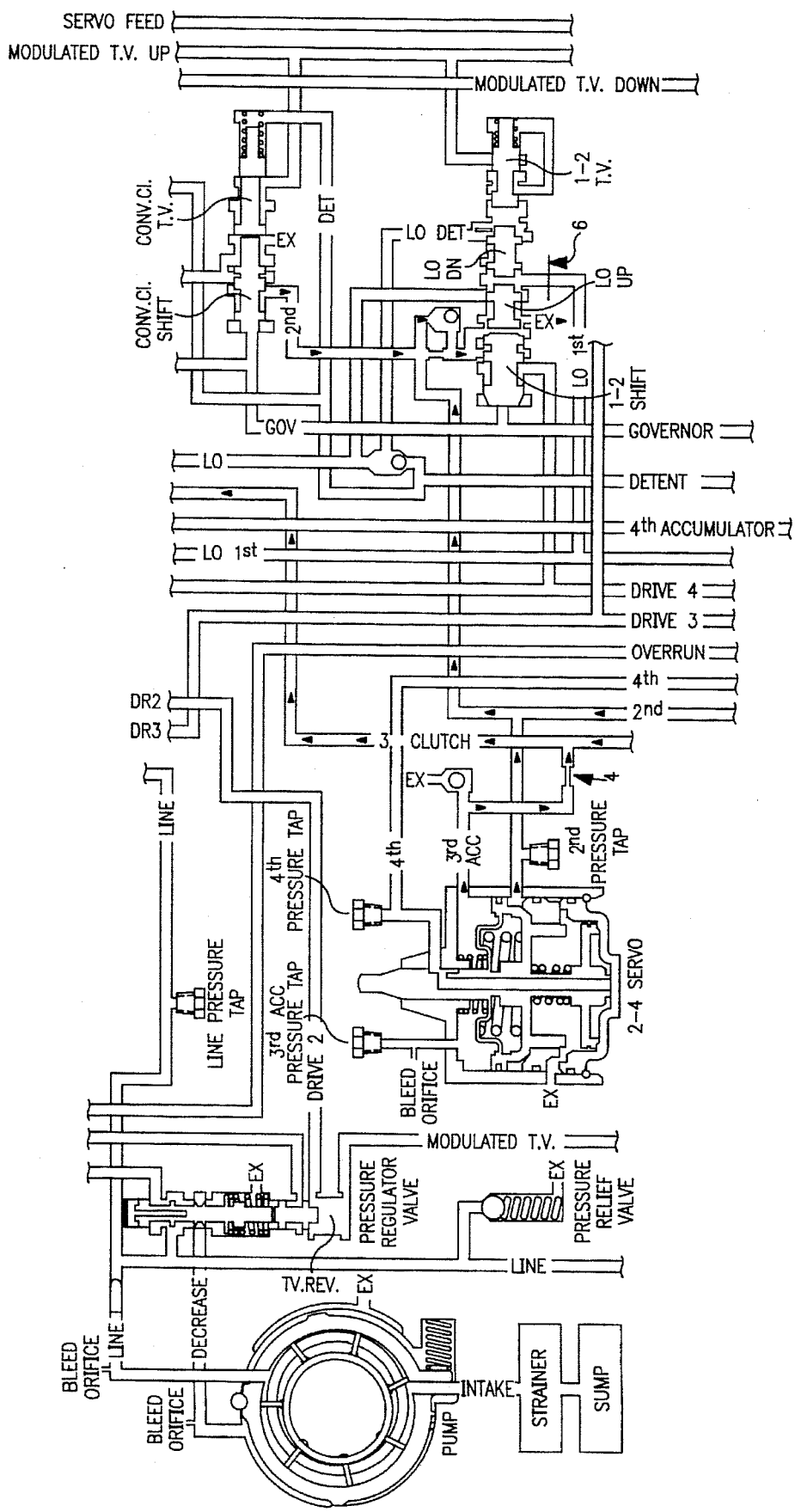
FIG. IB

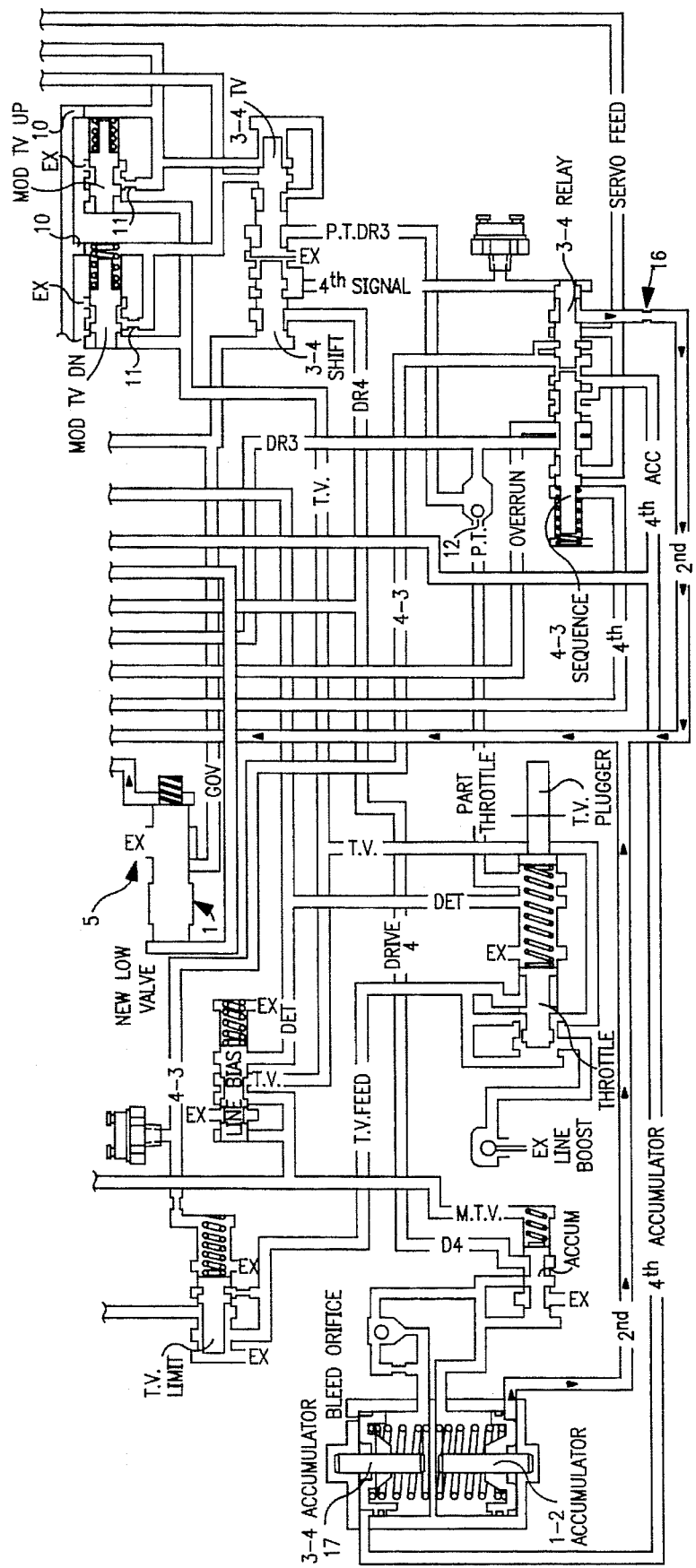
FIG. IC

METHODS AND SYSTEMS FOR IMPROVING THE OPERATION OF TRANSMISSIONS FOR MOTOR VEHICLES

BACKGROUND OF THE INVENTION

The methods and systems of the present invention are directed to the modification and improvement of transmissions for automotive vehicles of the type installed by the original equipment manufacturers. The invention is particularly directed to the improvement and modification of the automotive transmissions commonly known as the 700-3 [manually operated] and the 700-2 [automatic], both of which are "factory installed" in automotive vehicles manufactured by General Motors Corporation.

The present inventor owns U.S. Pat. No. 5,253,549, issued Oct. 19, 1993 and entitled "Methods And Systems For Improving The Operation Of Automatic Transmissions For Vehicles"; U.S. Pat. No. 4,790,938, issued on Dec. 13, 1988 and entitled "Filter For Removing Particulate Matter From Fluid Within A Movable Body"; U.S. Pat. No. 4,711,140, issued Dec. 8, 1987 and entitled "Throttle Valve System For Automatic Transmission"; and U.S. Pat. No. 4,449,426, issued on May 22, 1984 and entitled "Laminated Separator Plate Means For Recalibrating Automatic Transmission". The basic operation of transmissions for automotive vehicles is discussed in the aforementioned patents, and these patents are expressly incorporated by reference into the disclosure of the present patent application.

The basic principles of operation of the factory installed General Motors 700-2 and 700-3 transmissions for automotive vehicles, including the specific modes of operation thereof and the hydraulic circuits and interrelationship of hydraulic circuits, are well known to those skilled in the automotive transmission art. Attention is respectfully invited to the operations manual and text entitled *THM 700-R4, Principles Of Operation*, Second Edition, (1983), published by General Motors Corporation, said publication describing in detail, among others, the operation of the "factory installed" 700-2 and 700-3 General Motors transmissions, including a discussion of the structure, the hydraulic circuits, and the interrelationship between the structure and the hydraulic circuitry and fluid flow during normal operation of the transmissions in automotive vehicles. The disclosure of the aforementioned publication is expressly incorporated by reference into the disclosure of the present patent application as disclosing and illustrating background material known to those of ordinary skill in the automotive transmission art.

Attached hereto as an Appendix is a publication entitled "TRANSGO 700-2 & 3 REPROGRAMMING KIT", an instruction sheet describing the manner in which an automotive transmission mechanic implements the modifications to the 700-2 and 700-3 General Motors Corporation factory installed transmissions to achieve the goals of the present invention. The disclosure of the aforementioned instruction sheet is also expressly incorporated by reference into the present patent application.

In the original design of the 700-3 "factory installed" transmission, the first gear ratio cannot be obtained above a vehicle speed of approximately 28–30 miles per hour. (See page 4 of the aforementioned General Motors Corporation publication). A primary object of the present invention is to enable the driver of the vehicle having a 700-3 General Motors transmission to select any available gear ratio at any time, thereby enabling the driver to obtain a "first" gear ratio whenever the gear selector lever is placed in the "1" position. This objective is accomplished by modification of the structure and operation of the existing hydraulic circuits of the original transmission and the addition of a new hydraulic circuits to the original transmission.

It is also desirable to modify the "factory installed" automotive transmission to result in quick application and quick release forces with minimum ratio sharing (overlap), particularly when the vehicle is used for racing applications. This object is obtained by varying the structure and operation of the hydraulic circuits of the original transmission to enlarge or reduce existing orifices to control the apply and release fluid flow through the hydraulic circuits, in conjunction with the modification of different spring and pressure values of the pre-existing hydraulic circuits of the factory installed transmission.

Other objects, improvements and advantages of the present invention will become apparent to those skilled in the art from the following description in conjunction with the drawings.

SUMMARY OF THE INVENTION

Methods, apparatus and systems are provided for modifying the structure, operation, and functional relationship between structure in "factory installed" transmissions for automotive vehicles. In accordance with the present invention, the transmissions identified as 700-2 and 700-3 installed in General Motors Corporation vehicles are modified to enable the driver to select any available ratio at any time, and in particular to enable the driver to obtain a first ratio whenever the gear selector is placed in the first position. In the original "factory installed" transmission, the first ratio cannot be obtained for vehicle speeds exceeding approximately 28–30 miles per hour. The original transmission is modified to achieve this result by removing an existing 3–2 control valve from the original hydraulic circuitry, adding a new low control valve to the hydraulic circuits, regulating the opening of the governor valve of the pre-existing hydraulic circuits, adding new fluid flow channels to provide new hydraulic circuitry in the original existing hydraulic circuits, and discontinuing pre-existing original hydraulic circuits by plugging.

The present invention also modifies the aforementioned "factory installed" automotive transmissions by producing quick "applies" and "releases" with minimum ratio sharing (overlap), which is advantageous when the vehicle is used for racing applications. These further modifications to the operation of the original transmissions are achieved by enlarging or reducing (or plugging) orifices in the original hydraulic circuitry to modify fluid flow therethrough for controlling the apply and release fluid flow. Additionally, adjustments are made to spring and pressure values of the original transmission hydraulic circuitry.

Accordingly, the object of the present invention is to modify the operation of existing "factory installed" automotive transmissions, and in particular the General Motors Corporation 700-2 and 700-3 transmissions, to result in changes to the hydraulic circuitry and fluid flow therethrough to enable the driver of the vehicle to select any available ratio at any time, and to also produce quick "applies and releases" which are particularly advantageous when the vehicle is employed for racing applications. Other advantages and improvements of the methods, systems and apparatus of the present invention will become apparent to those skilled in the automotive transmission art from the following discussion in conjunction with the enclosed drawings.

BRIEF DESCRIPTION OF THE DRAWINGS

FIG. 1 illustrates the hydraulic circuitry of the General Motors Corporation 700 automotive transmission for "Manual Lo" as modified in accordance with the present invention;

DESCRIPTION OF THE BEST MODES FOR CARRYING OUT THE INVENTION

The present invention is directed to improvements and modifications to existing "factory installed" automotive transmissions, and in particular the transmissions known as General Motors Corporation 700-2 and 700-3. The objects of the present invention include modification of the structure, hydraulic circuitry, interrelationship of structure and fluid flow patterns through the hydraulic circuitry of the original automotive transmissions for the purpose of 1). enabling driver of the vehicle to select any available ratio at any time, and 2). to control the fluid flow through the hydraulic circuitry in order to produce quick "apply and releases". The modifications to the original operation and hydraulic circuitry of the "factory installed" automotive transmissions are made by removing structure including original valves, adding structure including new valves, adding new hydraulic circuits to the overall circuitry, discontinuing use of existing circuits by plugging; and modifying the flow through existing hydraulic circuitry by enlarging or reducing the size of fluid flow orifices and adjusting existing spring and pressure values.

The disclosure of the Applicant's prior U.S. Pat. Nos. 5,253,549; 4,790,938; 4,711,140; and 4,449,426 are expressly incorporated by reference into the disclosure of the present patent application. Additionally, the disclosure of the aforementioned General Motors Corporation operating manual entitled *THM 700 R4 Principles of Operation*, Second Edition (1983), which discloses in detail the structure and operation of the "factory installed" General Motors Corporation 700-2 and 700-3 automotive transmissions, among others, is expressly incorporated by reference into the disclosure of the present patent application as describing and illustrating basic operating principles and the hydraulic circuitry of the known automotive transmissions which constitute background information to the improvements of the present invention. The attached instruction sheet entitled "TRANSGO 700-2 & 3 REPROGRAMMING KIT", which is an Appendix to the present patent application and which describes the manner in which the known conventional automotive transmissions are modified in accordance with the present invention, is also expressly incorporated by reference herein and forms part of the disclosure of the present patent application.

Figure 2A:
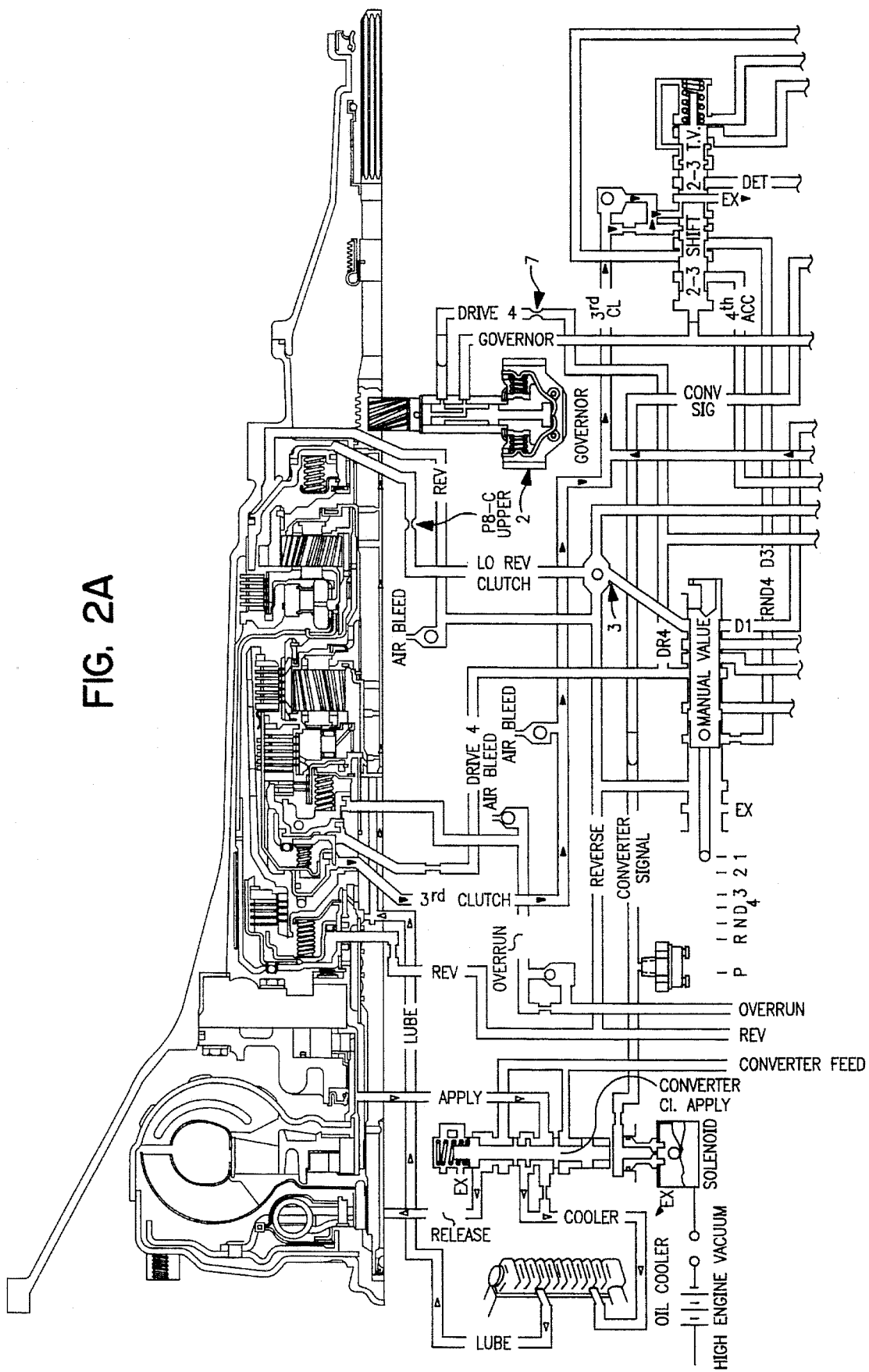
FIG. 2 illustrates the hydraulic circuitry of the General Motors Corporation 700 automotive transmission for "Manual Second", as modified in accordance with the present invention.
Figure 2B:
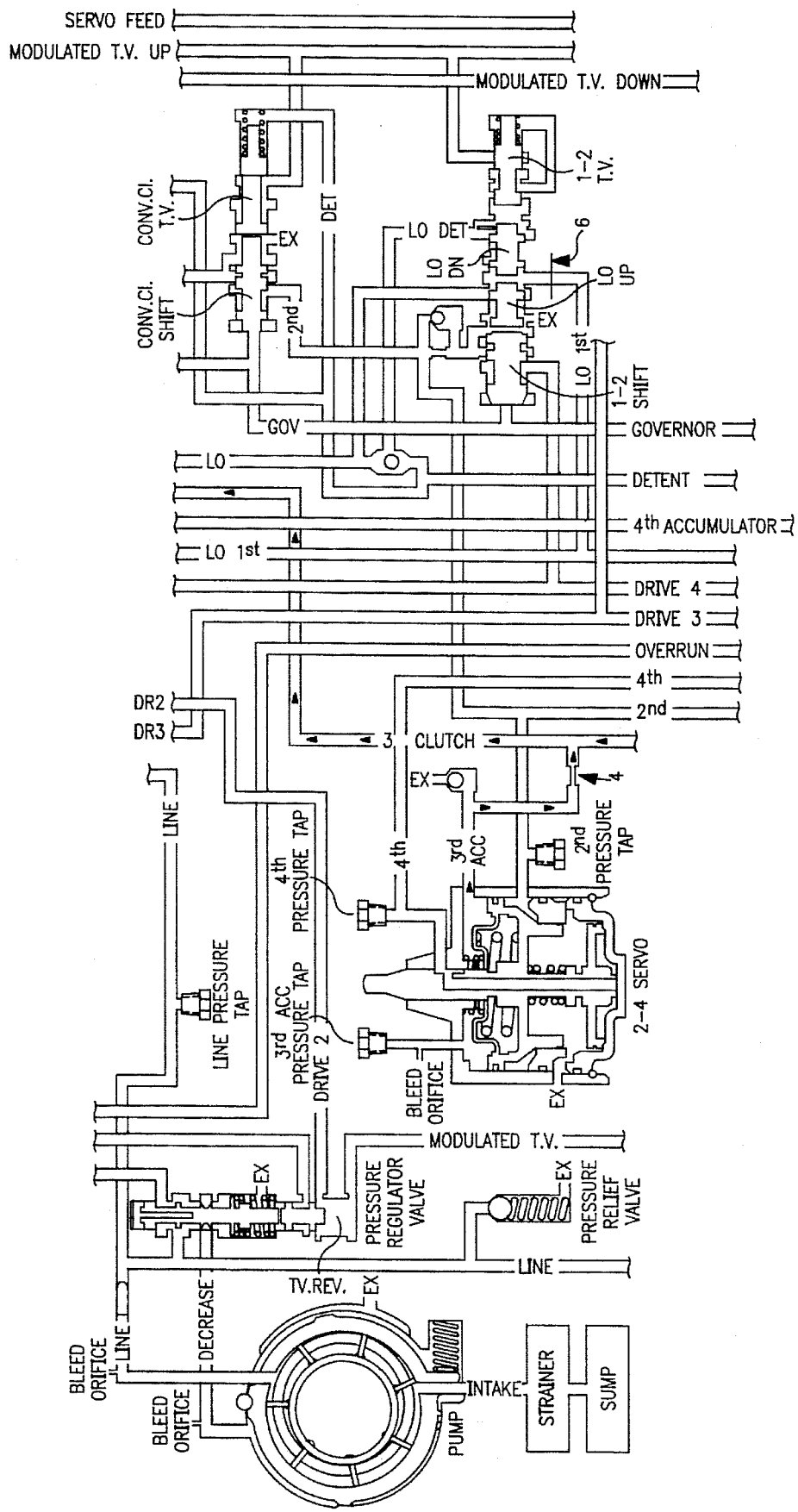
Figure 2C:
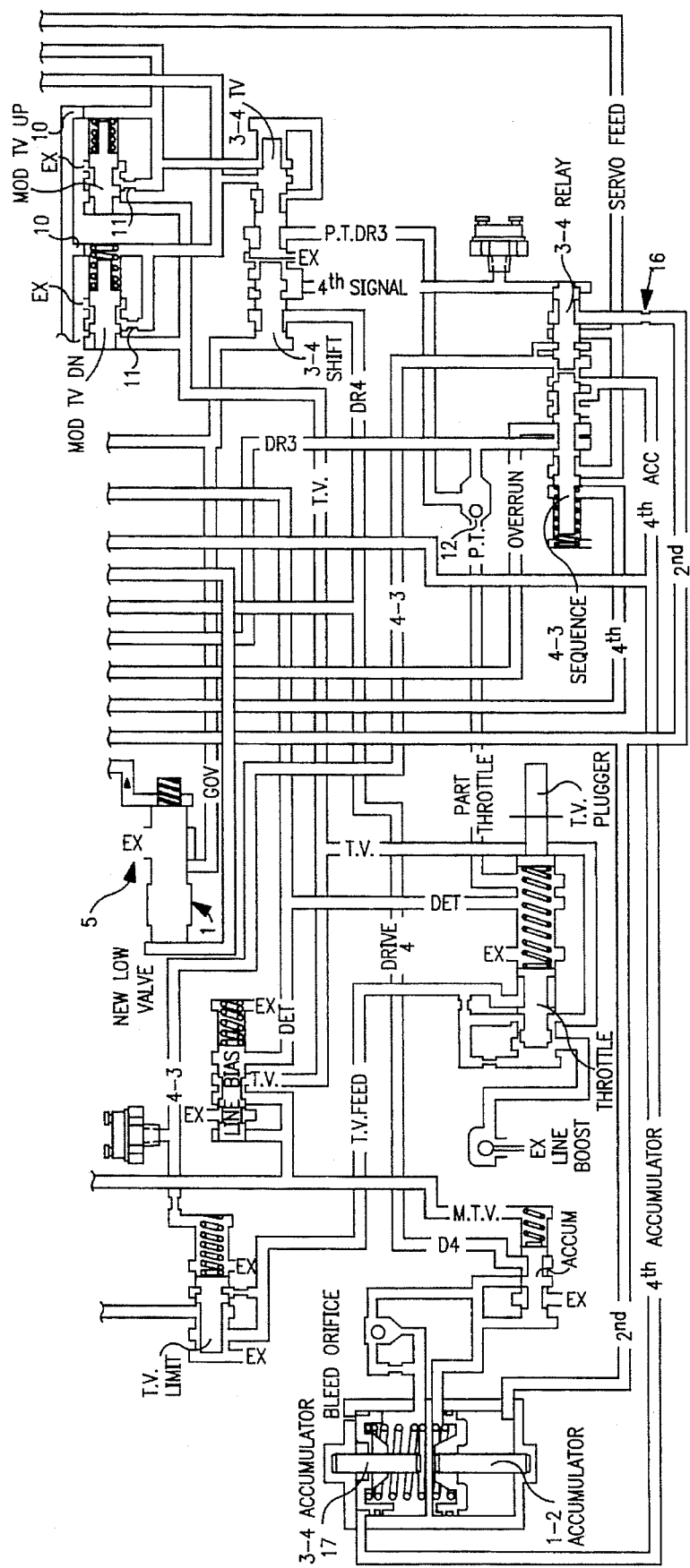

FIG. 1 of the drawings illustrates the modifications and improvements to automotive transmissions in accordance with the present invention for the "Manual Lo" phase of operation, and FIG. 2 of the drawings illustrates the modifications and improvements to automotive transmissions of the present invention for the "Manual Second" mode of operation. As defined at Page 4 of the aforementioned General Motors Publication entitled "THM 700-R4, PRINCIPLES OF OPERATION, "Manual Lo" is a gear selection which " . . . can be selected at any vehicle speed. The transmission will shift to second gear if it is in third or fourth gear, until it slows below approximately 30 m.p.h. (48 km/h) at which time it will downshift to first gear. This is particularly beneficial for maintaining maximum engine braking when descending steep grades".

The aforementioned General Motors publication also at page 4 defines "Manual Second" as: "Manual Second adds more performance. It has the same starting ratio as Manual Third range, but prevents the transmission from shifting above second gear, thus retaining second gear for acceleration or engine braking as desired. Manual Second can be selected at any vehicle speed. If the transmission is in third or fourth gear it will immediately shift to second gear".

Figure 3A:
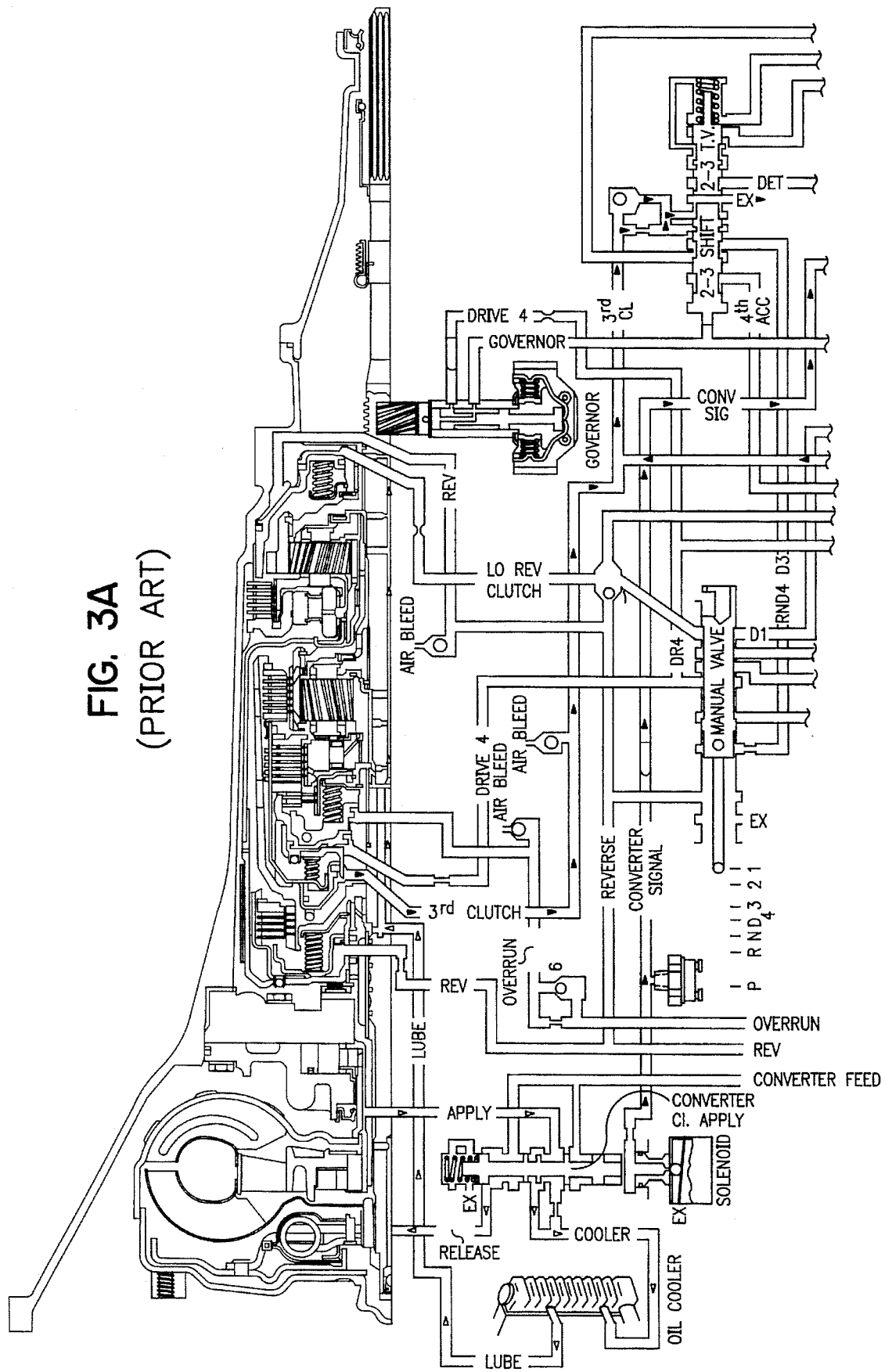
FIG. 3 illustrates the prior art hydraulic circuitry for the "factory installed" Manual Lo automotive transmission, prior to the modifications illustrated by FIG. 1.
Figure 3B:
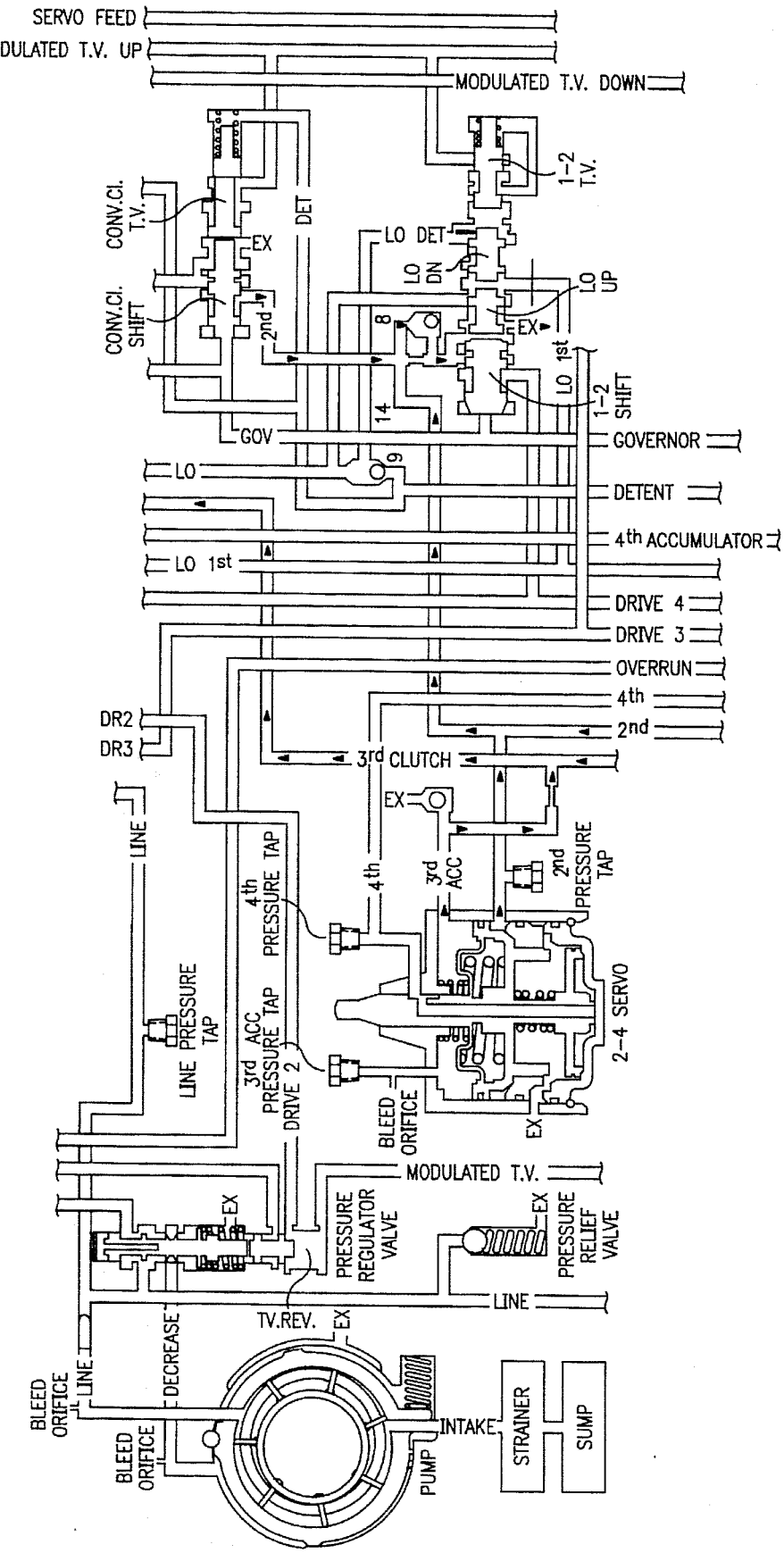
Figure 3C:
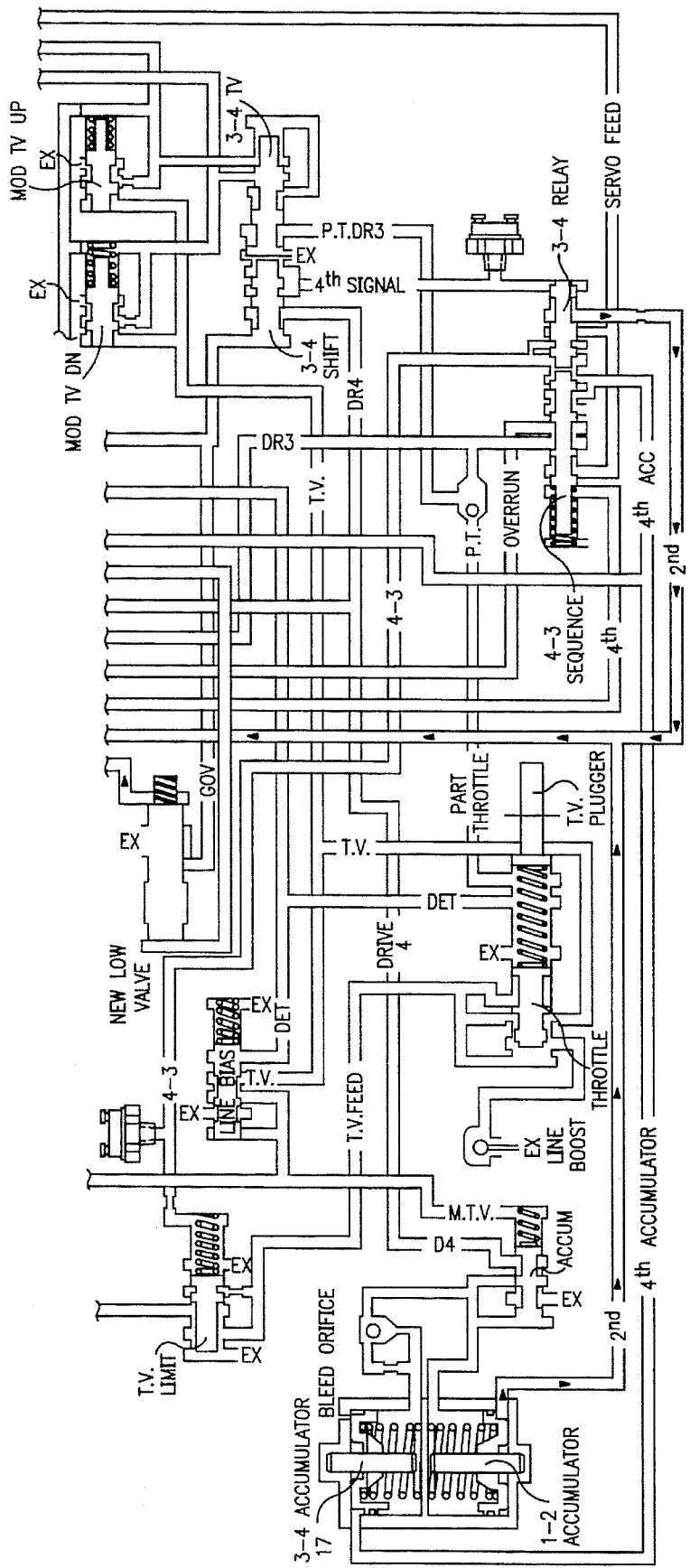
Figure 4A:
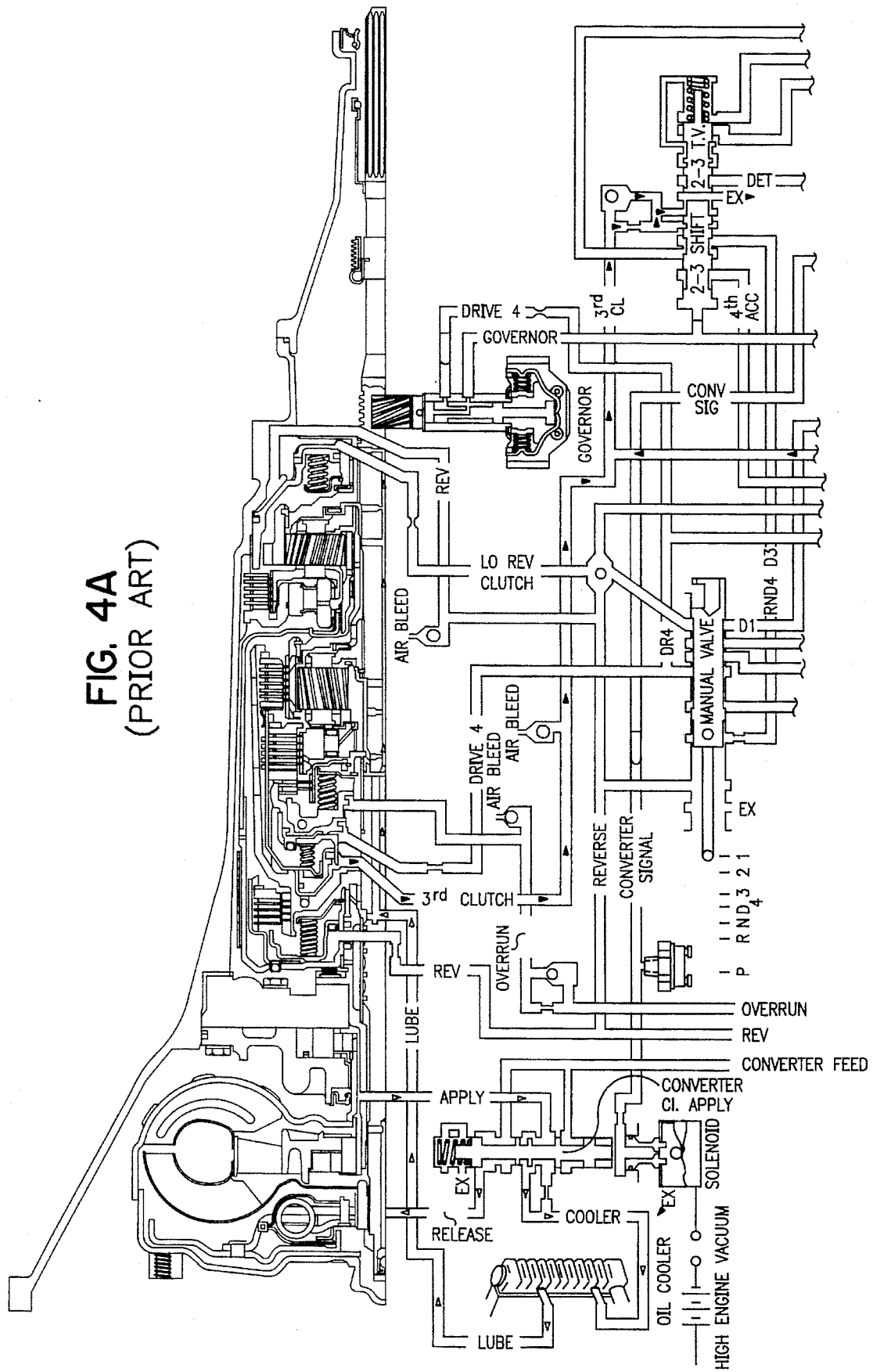
FIG. 4 illustrates the prior art hydraulic circuitry for the "factory installed" Manual Second automotive transmission, prior to the modifications illustrated by FIG. 2.
Figure 4B:
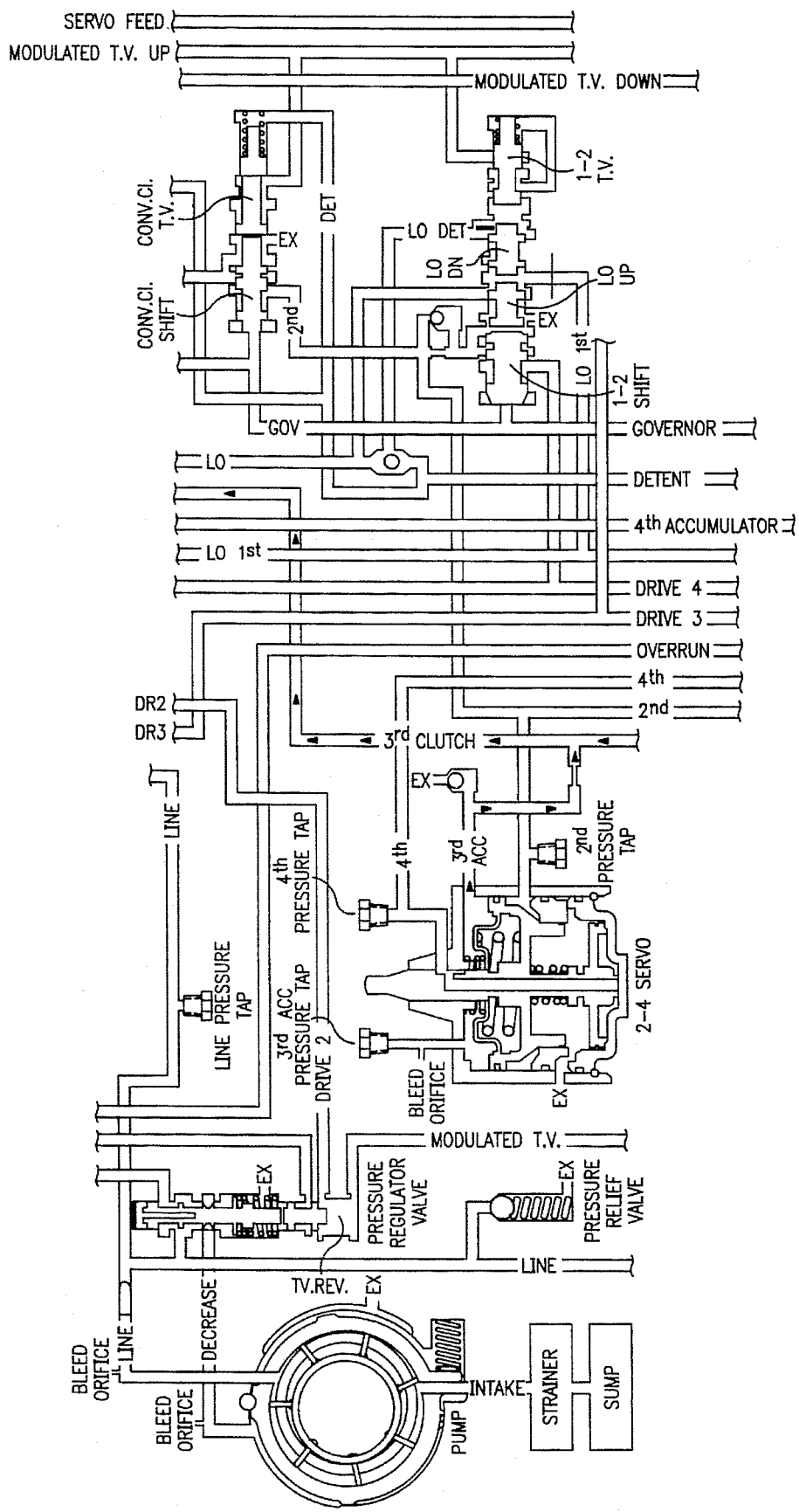
Figure 4C:
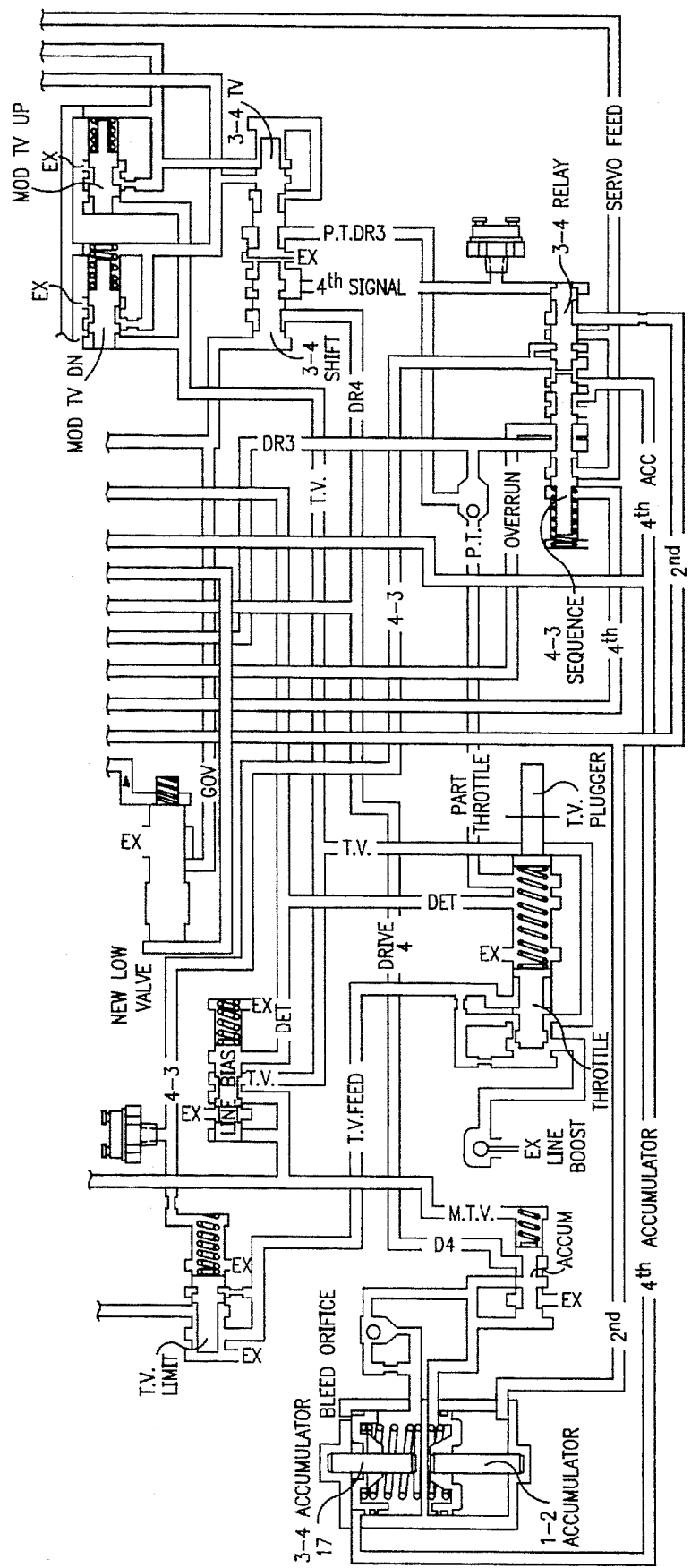

FIGS. 3 and 4, respectively, illustrate the prior art hydraulic circuitry of the automotive transmissions illustrated by FIGS. 1 and 2, for "Manual Lo" and "Manual Second" operation, prior to the modifications to the hydraulic circuitry illustrated by FIGS. 1 and 2. The description and operation of the prior art hydraulic circuitry illustrated by FIGS. 3 and 4 for the "Manual Lo" and "Manual Second" modes of operation is illustrated and discussed in the aforementioned prior art publication entitled "THM 700-R4, PRINCIPLES OF OPERATION, Second Edition (1983), published by General Motors Corporation.

As noted above, FIGS. 3 and 4 of the drawing illustrate, respectively, conventional prior art hydraulic circuitry for automotive transmissions in the "Manual Lo" and "Manual Second" phases of operation of a motor vehicle. The darkened channels shown in the respective hydraulic circuits illustrate fluid flow during the different phases of the operation of the automotive transmission, while the lightened channels designate no fluid flow therethrough. As indicated above, the specific modes of operation, including the fluid flow through the respective hydraulic circuits of the drawings illustrated by FIGS. 3 and 4, is discussed in the publication entitled "THM 700 R-4, PRINCIPLES OF OPERATION, Second Edition (1983), General Motors Corporation, the disclosure of which has been incorporated herein by reference. Moreover, operation of the automotive transmission illustrated by FIGS. 3 and 4 of the drawing, including the fluid flow through the hydraulic circuits illustrated by the drawings, is conventional, is well known to persons of ordinary skill in the automotive transmission art, and therefore will not be discussed in great detail in the present disclosure which is directed to improvements and modifications to the conventional hydraulic circuitry illustrated by FIGS. 3 and 4.

FIG. 1 of the drawing illustrates the hydraulic circuitry for operation of the known automotive transmission illustrated by FIG. 3, as modified in accordance with the present invention. FIG. 2 illustrates the hydraulic circuitry for the known automotive transmission illustrated by FIG. 4, as modified in accordance with the present invention. The darkened channels of the respective hydraulic circuits illustrate fluid flow through said channels, while the lightened channels indicate no fluid flow through those channels. A comparison of the hydraulic circuitry of FIG. 1 with that of FIG. 3, and a comparison of the hydraulic circuitry of FIG. 2 with that of FIG. 4, illustrates the preferred embodiments of the specific modifications to the hydraulic circuitry, and the resulting modifications to the fluid flow and operating sequence of the automotive transmission, in accordance with the preferred embodiments of the present invention resulting in the improvements and objectives referred to above. Attention is also invited to the publication entitled "TRANSGO 700-2 & 3 REPROGRAMMING KIT", attached hereto as an Appendix, for detailed instructions directed to transmission mechanics for modification of the hydraulic circuits of the prior art automotive transmission illustrated by FIGS. 3 and 4 to result in the improvements of the present invention illustrated by the hydraulic circuits of the automotive transmissions of FIGS. 1 and 2.

In order to achieve the first objective of the present invention, namely to select any available ratio (i.e., torque multiplying ratio), and not limit the availability of the first ratio only when the vehicle speed does not exceed 28 m.p.h., the "3–2 control valve" illustrated in FIGS. 3 and 4 of the conventional prior art hydraulic circuits is removed. (See also page 5 of the Appendix). A new low control valve, designated by reference numeral 1 in FIGS. 1 and 2 of the drawing, is installed as part of the hydraulic circuitry of the automotive transmission. (See also page 5 of the attached Appendix). The governor valve designated by reference numeral 2 in FIGS. 1 and 2 of the drawing, is opened into its full "ON" position by providing a wire spring (not shown in drawings) for this purpose. (See page 8 of the attached Appendix). New hydraulic circuits are provided by drilling (See pages 4 and 5 of the attached Appendix), and pre-existing circuits in the original hydraulic system illustrated by FIGS. 3 and 4 are discontined by closing selected openings and ports with plugs (See pages 5 and 6 of the attached Appendix). Preferably, the plugs are formed from a malleable metal, as for example, a malleable aluminum plug which will enable the effective plugging of odd shaped openings in the existing hydraulic circuitry. The addition of new hydraulic circuits to the overall hyrdraulic circuitry, and the discontinuation of pre-existing hydraulic circuits of the originally factory installed transmission by plugging, will be discussed in greater detail as follows.

Still referring to FIGS. 1 and 2 of the drawing (and to the designated portions of the attached Appendix), a new hydraulic circuit provided for actuating the new low valve 1, is added by drilling openings to provide a channel for connecting the "low oil" from the manual valve to the left end of the newly installed low valve 1. The respective openings are drilled at locations designated by reference numerals 3 and 4 in FIG. 1. By providing the new hydraulic circuit for actuating the new low valve 1, low oil from the pre-existing manual valve actuates the new low valve 1 when the manual valve is placed in the low "1" or first selector position.

When the low valve 1 is actuated and moved to the right, as shown in FIG. 1, the governor pressure (which holds valves in upshifted positions) is exhausted through a new opening designated by reference numeral 5 drilled in the low valve 1. Simultaneously, low oil is routed from the manual valve to the "1–2" shift valve (illustrated in FIG. 1), causing the "1–2" shift valve to downshift into the "1" low position thereof. The fluid flowing through this new low circuit (between the manual valve and the "1–2" shift valve) is prevented from leaking by plugging the existing hydraulic circuitry at the location where the "low first" line is coupled to the "1–2" shift valve, designated as reference numeral 6 in FIG. 1. (See page 7 of the attached Appendix).

To prevent exhausting a large volume of fluid at the new low valve 1, preferably an orifice of the size 0.063 inches in diameter is installed at the inlet to the governor 2 at the location designated by reference numeral 7 on FIG. 1 of the drawing (See also page 8 of the attached Appendix). The governor oil pressure is the same as the mainline oil pressure in the mode of operation of the transmission as illustrated by FIG. 1 of the drawing. The governor valve 2 is shimmed to its full "ON" position by a spring (not shown) which blocks the weight (and subsequently the valve) to its full "OPEN" position. Accordingly, as a result of this modification, the governor pressure is the same as the mainline pressure in the hydraulic system illustrated by FIG. 1. (Also see page 8 of the attached Appendix).

In the "1" or first gear selector position, the transmission is not capable of upshifting at the new low valve 1 because the governor is exhausted through the new exhaust opening provided in the new low valve 1 at the location designated by reference numeral 5 of FIG. 1. When the selector lever is moved out of the "1" or first gear selection position, manual low oil is exhausted at the manual valve. The new low valve 1 will now move to the left in FIG. 1, away from a spring to close the exhaust port designated by reference numeral 5. The governor circuit now attains a fluid pressure which equals mainline pressure, resulting in movement of the shift valves to the position selected by the driver via the manual valve, as further illustrated by the hydraulic circuit of FIG. 2 ("Manual Second").

Still referring to the hydraulic circuit illustrated by FIG. 1 of the drawing, another orifice of the size 0.063 inches in diameter is installed in the circuit at the area designated by reference numeral 8 to prevent the transmission from applying the low clutch too rapidly during a manual downshift to first gear. The orifice designated by reference numeral 8 is provided in the line designated as "Lo Rev Clutch" which is coupled in fluid flow relationship to the opening designated by reference numeral 3, discussed above, which has been provided to connect the low oil from the manual valve to the new low valve 1. (Attention is also directed to page 8 of the attached Appendix for a further description of the orifice provided at the location designated by reference numeral 8 in FIG. 1).

The valves "Mod. T.V.—DN" and the "Mod. T.V.—UP" in FIGS. 1 and 2 are connected in fluid flow relationship by drilling two openings (preferably 0.110 inches) designated by reference numeral 10 to connect two partitions, as discussed at page 5 "Stick Only" in the attached Appendix. The "Mod. T.V.—DN" and "Mod. T.V.—UP" are also plugged as designated by reference numeral 11. In this manner, the hydraulic circuit of the "factory installed" automotive transmission as illustrated by FIG. 3, is modified to that as illustrated by FIG. 1. The drilling and plugging operations on the "Mod. T.V.—DN" and "Mod. T.V.—UP" valves are further discussed below.

If the driver or operator of the vehicle desires automatic up and down shifts, but wishes to maintain the ability to maintain the first gear ratio at any time (and thereby obtain full race firmness), the spring on the governor valve which is provided to maintain the governor valve in its full "open" or "on" position is omitted; and the drilling and plugging operations discussed above and designated by reference numerals 10 and 11 on FIG. 1 of the drawing, are not conducted.

On certain automotive transmission models, a "4–3" downshift always occurs at wide open throttle conditions. Accordingly, it is not possible to obtain fourth gear at all times on the models. In accordance with the present invention, fourth gear may be obtained at any time during the operation of the automotive transmission illustrated by FIGS. 1 and 2 by making the following further revisions to the T.V. circuit of the hydraulic system illustrated by FIGS. 1 and 2 of the drawing in accordance with the present invention. The T.V. pressure at the Mod. T.V. DN and Mod. T.V. UP valves is blocked by installing two plugs as indicated by reference numeral 11. (Also see page 5 of the attached Appendix). In this manner, T.V. fluid pressure is denied to the spring end of said shift valves, which in the original design of the hydraulic system for the automotive transmission (FIGS. 3 and 4) controls the occurrence of a shift. Oil from the "Drive 3" line (D3) is connected into the revised T.V. circuit by flowing in at the spring end of the "Mod. T.V.—DN" and "Mod. T.V.—UP" valves, thereby replacing the T.V. pressure provided in the original hydraulic circuit (FIGS. 3 and 4) of the factory installed transmission. (Attention is also directed to page 5 of the attached Appendix instructing the drilling of 0.110 inch holes through two partitions).

On other transmission models, the PT (part throttle) land area prevented wide open throttle shift to fourth gear. This difficulty is overcome in accordance with the present invention by revising the hydraulic circuit of the factory installed automotive transmission shown by FIGS. 3 and 4 to that illustrated by FIGS. 1 and 2, as follows. An opening is plugged at the location designated by reference numeral 12 in the PT (part throttle) oil line to the "3–4" shift valve, allowing fourth gear to be obtained when the gear selector lever is moved to the 4th (O.D.) position.

The description of the preferred embodiment of the invention thus far has been directed primarily to the modification of the "factory installed" automotive transmissions illustrated by FIGS. 3 and 4 to enable the driver of a vehicle to select any available gear ratio at any time, and not be constrained by the speed at which the vehicle is being driven. A second object of the present invention is to modify the hydraulic circuitry of the factory installed automotive transmissions illustrated by FIGS. 3 and 4 to product quick apply and release forces with minimum ratio sharing (i.e., overlap). These later modifications are particularly useful in connection with racing applications for the vehicle. The modifications generally are accomplished by enlarging or reducing fluid flow orifices to control the apply and release fluid flow in the hydraulic circuits, and by varying spring and pressure values in the hydraulic system for further controlling the apply and release fluid flow.

Referring to FIGS. 1 and 2, reference numeral 13 designates the location in which an orifice of 0.083 inches in diameter in the "factory installed" transmission is enlarged to a diameter in the range of 0.160 inches–0.187 inches. Orifice 13 is provided in the fluid flow line designated RND 4 D 3 which is in fluid communication with the Manual Valve.

The orifice designated by reference numeral 14, which is 0.070 inches in diameter in the "factory installed" transmission, is enlarged to a diameter in the range of between 0.073 inches–0.086 inches. Orifice 14 is provided in a line which is coupled in fluid communication with the "1–2" shift valve illustrated in FIGS. 1 and 2 of the drawings.

Reference numeral 15 designates an orifice which is enlarged from 0.099 inches in diameter in the "factory installed" transmission to a diameter in the range of between 0.156 inches–0.187 inches. Orifice 15 is provided in a line which is in fluid communication with the "2–3" shift valve as illustrated in FIGS. 1 and 2 of the drawing.

Reference numeral 16 designates an orifice which has been enlarged from 0.062 inches in diameter in the "factory installed" transmission to a diameter in the range of 0.156 inches–0.200 inches. Orifice 16 is provided in the line designated as "2nd" which is an outlet line in fluid communication with the "3–4" relay as illustrated in FIGS. 1 and 2 of the drawing.

Orifice 4 is enlarged from the "factory installed" range of between 0.041 inches–0.73 inches in diameter to a range of 0.100 inches–0.116 inches in diameter. Orifice 4 is provided in an hydraulic circuit coupled between the "2–4" servo and the "3rd" clutch outlet line from the new low valve 1.

In addition to the above, opening "F" discussed and illustrated at pages 6–7 of the attached Appendix, can also be plugged to close the original openings provided in the "factory installed" valve body plate. Preferably the plugs are slightly smaller than the opening to be plugged to permit the plug to expand and fill the opening when struck with a hammer during installation by a transmission mechanic. As noted above, preferably the plugs are formed from a malleable metal, such as aluminum, so that the plugs will fit within odd shaped openings, if required.

Further modifications to the "factory installed" automotive transmissions illustrated by FIGS. 3 and 4 include removal of the cushion springs in the servo as discussed at page 8 of the attached Appendix. Additionally, the 3–4 accumulator is plugged at the area designated by reference numeral 17 in the line designated as 4th accumulator in fluid communication with the "3–4" accumulator illustrated in FIGS. 1 and 2 (See also page 8 of the attached Appendix).

The specific installation procedure to be followed by transmission mechanics in enlarging the orifices, plugging the lines, and removing the springs, as discussed above, is also discussed and disclosed in the attached Appendix which is incorporated by reference and forms part of the present specification.

The modifications and revisions to the "factory installed" automotive transmissions illustrated by FIGS. 3 and 4 of the drawing, the operation of which is disclosed and described in the aforementioned publication entitled "THM 700 R4 PRINCIPLES 0F OPERATION", the disclosure of which is expressly incorporated by reference herein, results in improvements to the operation of the automotive transmission by varying the fluid flow through the hydraulic circuitry to (1) to enable the operator of the vehicle to select any available ratio at any time regardless of the actual vehicle speed, and (2) produce quick apply and release fluid pressure with minimum ratio sharing (overlap) which is particularly useful for racing applications of the vehicle. The improvements are achieved by providing additional hydraulic circuits, eliminating pre-existing hydraulic circuits, adjusting fluid pressure and spring values, and enlarging and/or plugging orifices and fluid flow lines, as discussed herein.

Other improvements and modifications within the scope of the present invention will become apparent to those skilled in the art. Accordingly, the description of the preferred embodiments of the invention herein is intended to be illustrative only and not restrictive of the scope of the invention, that scope being defined by the following claims and all equivalents thereto.

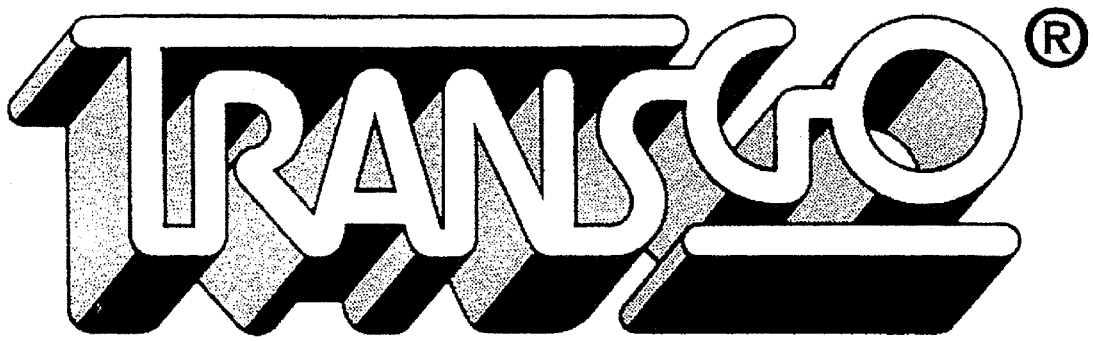

700-2&3 Reprogramming Kit™
Valve Body, Accumulator & Servo Parts

This kit installs in the vehicle or with the trans on the bench.
We advise you to start with a complete normal working trans so that you won't end up with cross mixed parts.
This is a race only product for professional installation and use ONLY. It is not a "do-it-yourself" product. It's for the experienced, full time, professional transmission mechanic who is alredy completely familiar with 700 trans repair.

Read enclosed notice thoroughly before installing this kit.

Choose: Stick Shift or Automatic.

Full Race-*Stick Shift:* -3 Setup: Manual shift only.
Trans will start off in what ever gear the selecter lever is in.
Will shift to any gear ratio selected, at any speed, by moving the lever.

Full Race-*Automatic:* -2 Setup: Will not shift above the
ratio selected with the shift lever. Will downshift to any ratio, at any speed with the selector lever. High throttle 3-4 shift delay is controlled with lever.

*Some pointers for increasing trans reliability with Stick Shift-3 setup:*
Never stall the engine in 3rd or 4th.
Don't start-off in 3rd or 4th.
Don't use full throttle in 4th under 60 MPH.

Burnouts:
In water or bleach box: Break it loose in 1st/2nd, then upshift to 3rd.

THESE ARE THE TRANSMISSION RATIOS:
"1st" 3.06    "2nd" 1.63    "3rd" 1.00    "4th" .70
To find top gear ratio, multiply the axle ratio x .7 [Example 3.73 x .7= 2.61]
Other ratios: Axle ratio x trans ratio. [Example 3.73 x 3.06= 11.4138]

TransGo® 2621 Merced Ave, El Monte, CA 91733-1997
Sales office: (818) 443 7456            Technical: (213) 283 4520

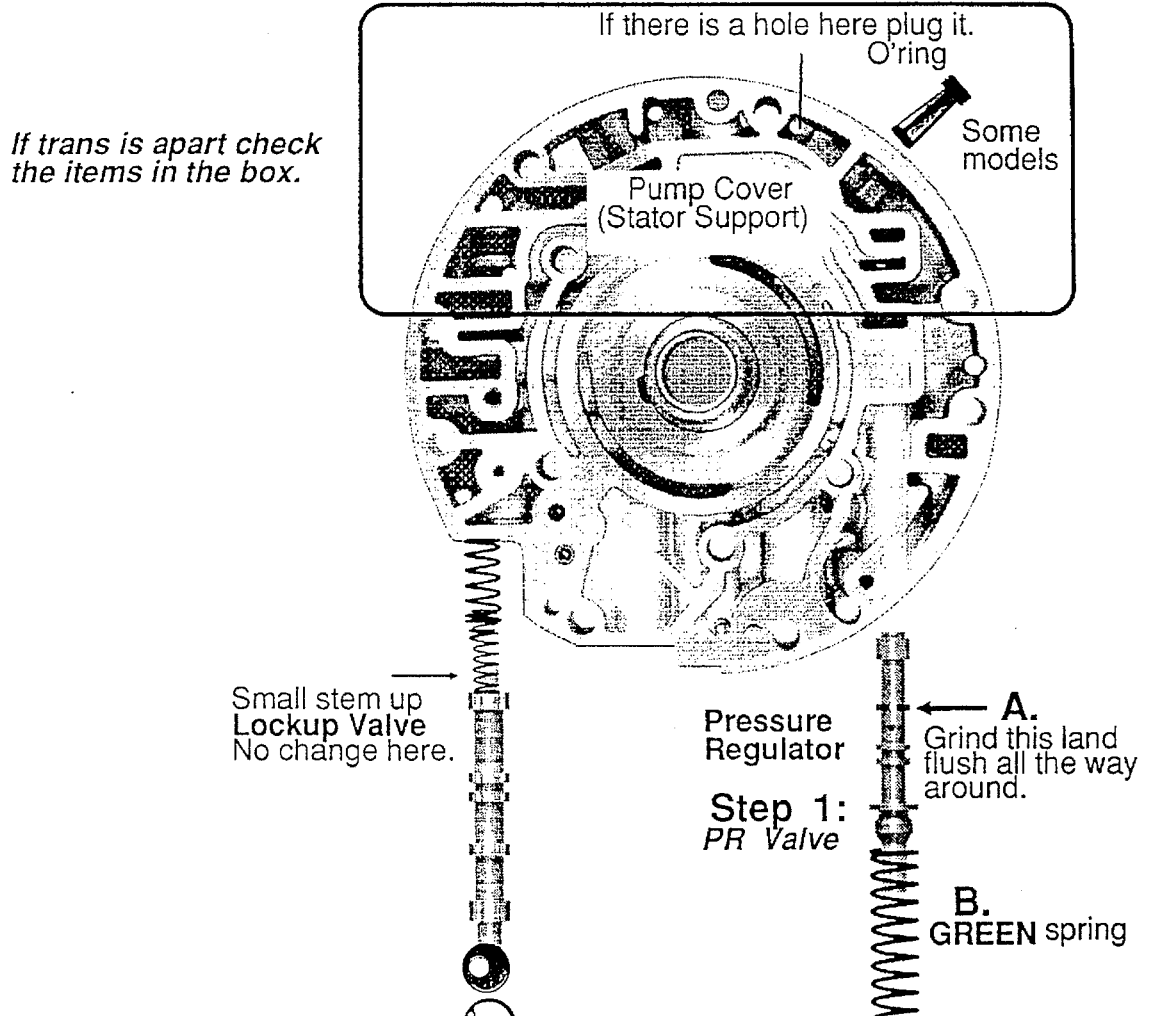

*If trans is apart check the items in the box.*

If there is a hole here plug it.
O'ring
Some models
Pump Cover (Stator Support)

Small stem up
Lockup Valve
No change here.

Pressure Regulator

Step 1: *PR Valve*

← A. Grind this land flush all the way around.

B. GREEN spring

Step 2: Mic the small land on the Int/Rev valve. If it is smaller than .262 diameter you will need a larger size to produce a really firm manual 1-2 shift. Use GM 8663951 or 8648959 or see "Goodies".

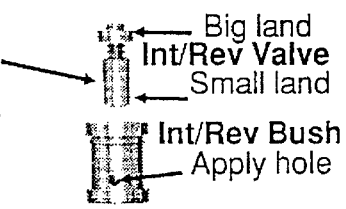

Big land
Int/Rev Valve
Small land
Int/Rev Bush
Apply hole

Step 3: Place flat end of boost valve on matching SPOT. If valve fits "A" don't use it. Rob another pump it you have one or buy a larger valve. Small block use .422 diam #8634941. Big block .472 diam #8634940. Can't find right valve? See "Goodies".
*Circle size you installed so you can install the correct line bias spring at page 5, "E".*

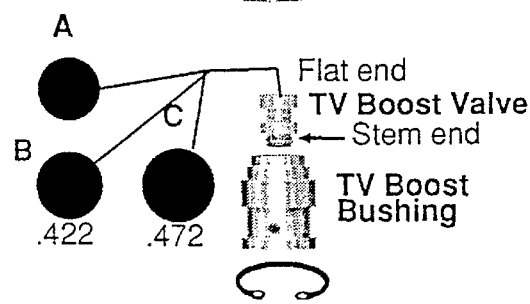

Flat end
TV Boost Valve
Stem end
TV Boost Bushing

Identify the Valve Body

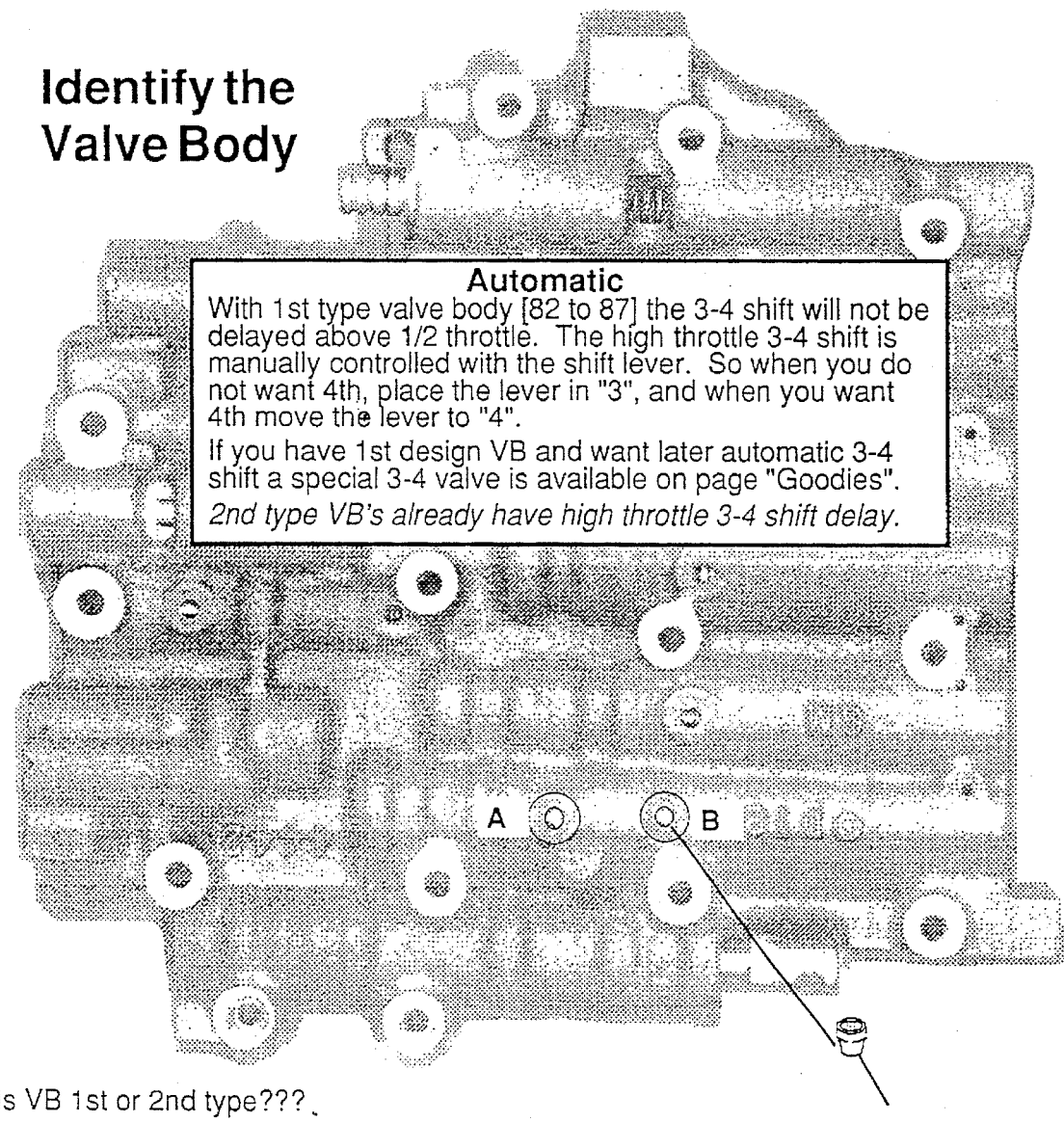

Automatic
With 1st type valve body [82 to 87] the 3-4 shift will not be delayed above 1/2 throttle. The high throttle 3-4 shift is manually controlled with the shift lever. So when you do not want 4th, place the lever in "3", and when you want 4th move the lever to "4".

If you have 1st design VB and want later automatic 3-4 shift a special 3-4 valve is available on page "Goodies".

*2nd type VB's already have high throttle 3-4 shift delay.*

Is VB 1st or 2nd type???

VB has holes "A" & "B": It is a *1st type VB*.---*Plug hole "B" with solid plug furnished*

VB has hole "A" ONLY: It is *2nd type VB*.----*Do not plug any hole.*

Automatic
Follow all the instructions except the parts that say, "STICK ONLY".
Stick Shift
Follow all the instructions including the parts that say, "STICK ONLY".

Drilling holes through partitions

Aim an ice pick on the angles shown about 1/8" down from the top of the partition and smack it smartly with a hammer to make a dink. Then drill a .110 hole on the same angle. Then enlarge one hole with .157 drill where it says to. .110 and .157 drills are furnished

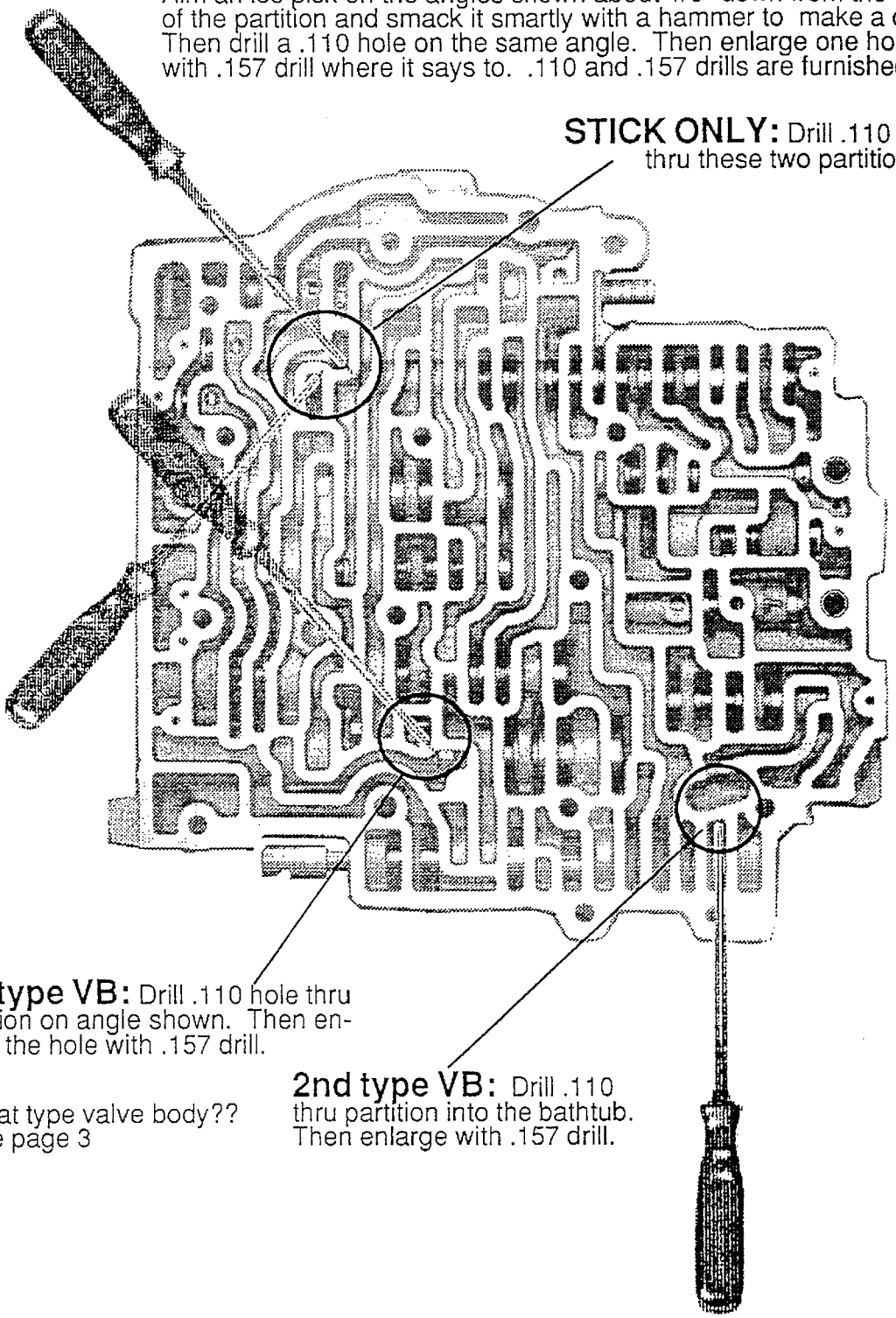

STICK ONLY: Drill .110 hole thru these two partitions

1st type VB: Drill .110 hole thru partition on angle shown. Then enlarge the hole with .157 drill.

What type valve body?? See page 3

2nd type VB: Drill .110 thru partition into the bathtub. Then enlarge with .157 drill.

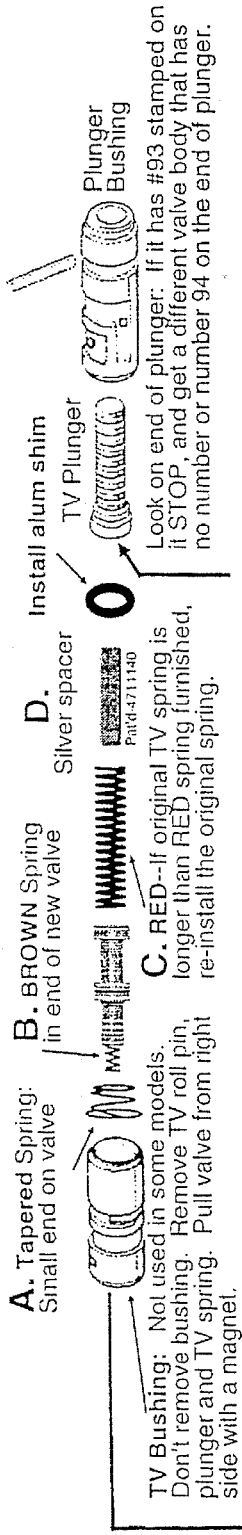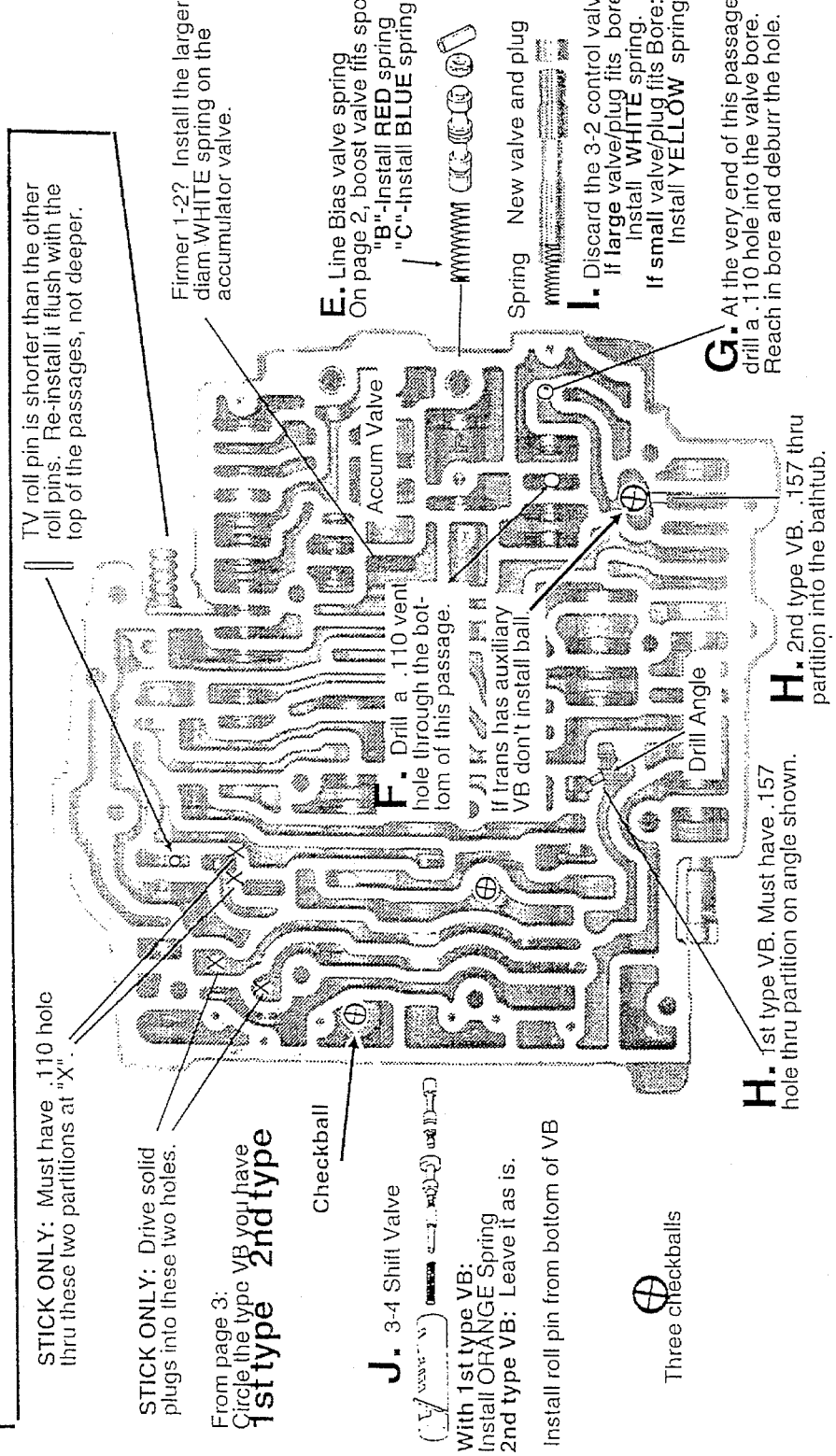

Plug holes in plate like this:

1. Turn a 3/8 or larger drill *by hand* on both sides of plate to make a slight chamfer on the flat sides of square holes and all around round holes. Or on square hole you can use a small file.
2. Place the plate on cement floor and insert the alum plug that fits the hole.
3. Hold the plate down against the cement close to hole and smack the plug three or four times with 6 to 8oz hammer.
4. File the plug flush with the plate on both sides. Old dull files will not file alum. Use a good file up close to the shank where the teeth are still sharp.

*Be sure you are plugging the correct holes.*
1st type VB: Plug 5, F&H [Plate must have 3&4]
2nd type VB: Plug 5, D&F [If plate has 4, plug it]

Plugs furnished

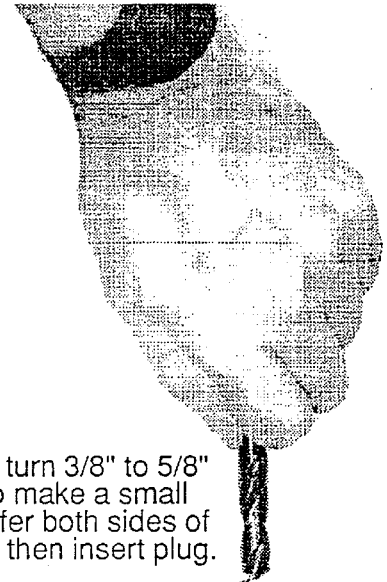

Hand turn 3/8" to 5/8" drill to make a small chamfer both sides of plate, then insert plug.

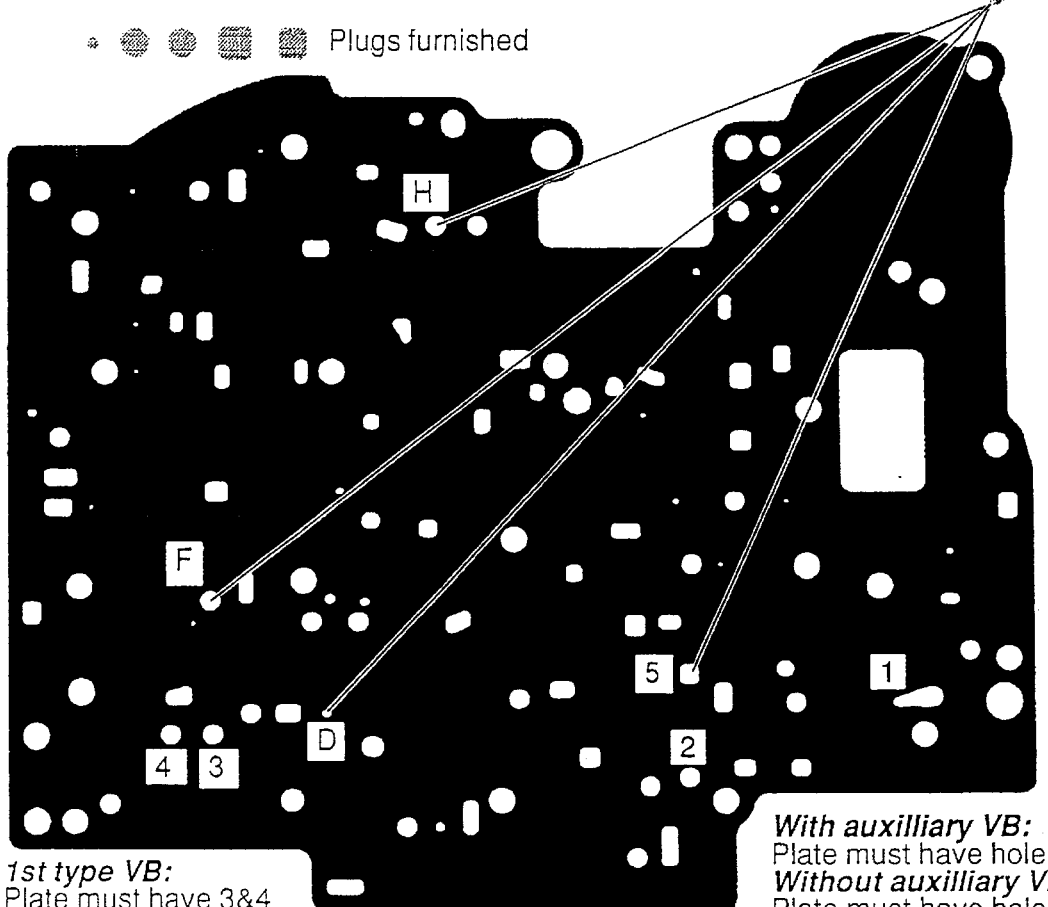

*1st type VB:*
Plate must have 3&4
*2nd type VB:*
Must not have hole 4

*With auxilliary VB:*
Plate must have hole 1.
*Without auxilliary VB:*
Plate must have hole 2.

Hole Sizes---Parts matching recheck

It is best to use a working transmission to assure that the valve body, plate and case match each other.

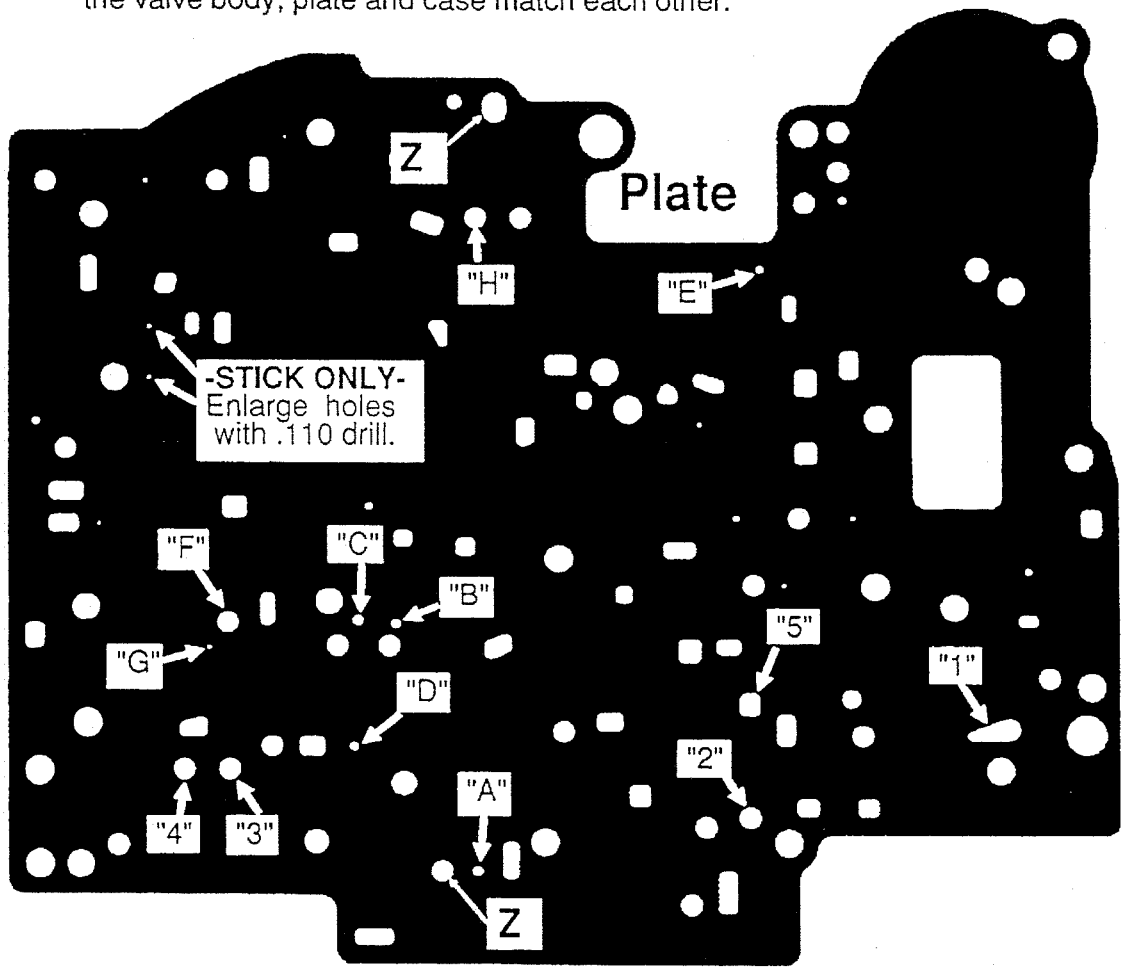

Circle Valve body type here: ⟶ *1st type*   *2nd type*

Drill these holes: A= .160 to .187
B= .093 to .110   C= .156 to .187
*1st type VB:* D= .156 or bigger
*2nd type VB:* D= Plug it.
E= .156 to .200   G= .110 to .116
*Stick only:* Drill two holes .110

*Listen up:* Might need to file a case partition a little bit to full flow hole "B". Install plate on the case with bolts thru holes "Z". Look thru hole "B". If hole overhangs the partition, file the partition until the hole will full flow.

RECHECK plate. *Circle plate data here:*
*1st type VB:* Holes 5,F&H are plugged.
        Plate must have holes 3&4.
*2nd type VB:* Holes 5,D&F are plugged.
H is not plugged. Plate has hole 1, and no hole at 2 & 4. [Or 4 has been plugged]
*Stick only:* Two holes drilled .110
  If trans has auxiliary valve body [87up] the plate must have hole 1, and must not have hole 2.

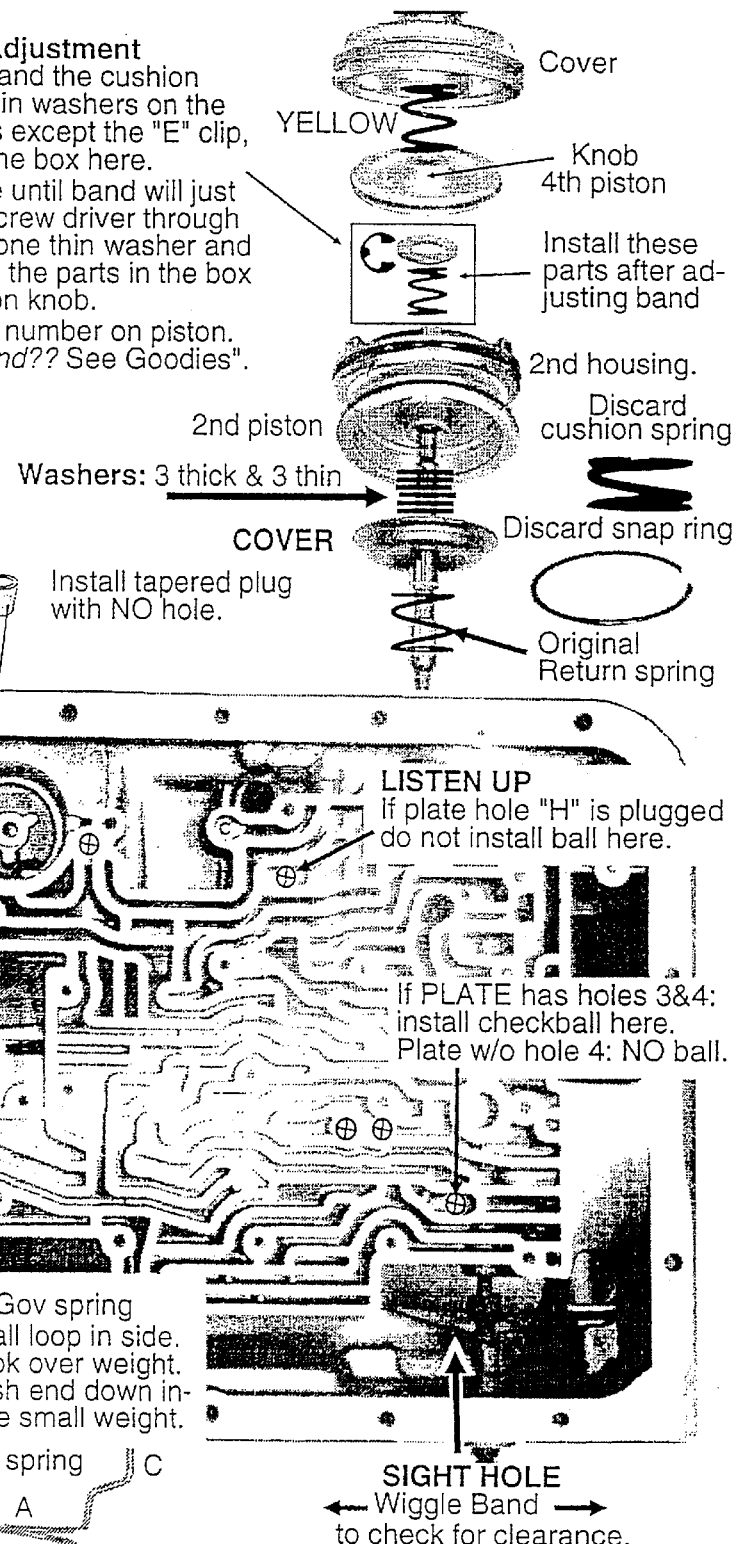
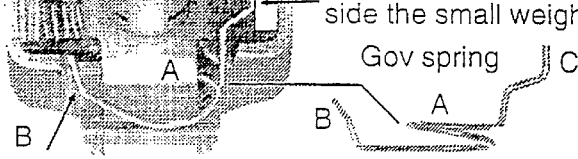

I claim:

1. A method for modifying the hydraulic circuitry of an automotive transmission of the type including a governor, a "3-2" control valve, a "3-4" shift valve coupled in fluid flow relationship with said "3-2" control valve, said "3-4" shift valve and said "3-2" control valve being in fluid communication with said governor, and a manual valve coupled to a gear selector; said method comprising the steps of:

removing said "3-2" control valve from said hydraulic circuitry of said automotive transmission, and coupling a low valve in fluid flow relationship to said manual valve such that said low valve is actuated by low oil pressure flowing from said manual valve when said manual valve is moved into a first gear selector position.

2. The method as claimed in claim 1 further including the method of coupling said low valve in fluid flow relationship to said governor.

3. The method as claimed in claim 2 further including the step of providing an opening in said low valve for exhausting fluid pressure from said governor.

4. The method as claimed in claim 1 further including the step of coupling said "3-4" shift valve in fluid flow relationship with said low valve.

5. The method as claimed in claim 1 further including the step of opening said governor into a substantially full opened position when said automotive transmission is operating in a "manual lo" position by applying a resilient force to said governor.

6. The method as claimed in claim 1 further including the step of plugging a low fluid pressure line coupling said manual valve and a "1-2" shift valve of said hydraulic circuitry.

7. The method of claim 3 further including the step of providing an orifice at an inlet to said governor to reduce fluid flow into said low valve through said manual valve to reduce the quantity of fluid exhausted through said opening in said low valve.

8. The method as claimed in claim 7 further including the step of moving said low valve into a position for closing said opening defined in said low valve such that fluid pressure in said governor is substantially equal to mainline fluid pressure in said hydraulic circuitry of said automotive transmission.

9. The method as claimed in claim 1 wherein said hydraulic circuitry of said automotive transmission includes a pair of throttle valves coupled to a throttle valve pressure line, said method further including the step of blocking throttle valve pressure from said throttle valve line into said pair of throttle valves, and applying fluid pressure to said pair of throttle valves from a 3rd drive line in fluid communication with said manual valve.

10. The method as claimed in claim 1 wherein said hydraulic circuitry of said automotive transmission includes a part throttle line in fluid communication with said "3-4" shift valve, said method further including the step of plugging said part throttle line to allow fluid to flow into said "3-4" shift valve to attain 4th gear whenever said gear selector is placed into a 4th gear position.

11. The method as claimed in claim 1 wherein said hydraulic circuitry includes a "2-3" shift valve in fluid communication with said manual valve, said method further including the step of providing a fluid flow orifice having a diameter in the range of 0.160 inches–0.187 inches in a line connecting said manual valve with said "2-3" shift valve.

12. The method as claimed in claim 1 wherein said hydraulic circuitry includes an inlet line coupled to a "1-2" shift valve, said method further including the step of providing an orifice in said inlet line having a diameter in the range of 0.073 inches–0.086 inches.

13. The method as claimed in claim 1 wherein said hydraulic circuitry includes an inlet line coupled to a "2-3" shift valve, said method further including the step of providing an orifice in said inlet line having a diameter in the range of 0.156 inches–0.187 inches.

14. The method as claimed in claim 1 wherein said hydraulic circuitry includes a "3-4" relay coupled in fluid communication to a "1-2" shift valve, said method further including the step of providing an orifice in a line coupling said "3-4" relay to said "1-2" shift valve, said orifice having a diameter in the range of 0.156 inches–0.200 inches.

15. The method as claimed in claim 1 further including a 3rd clutch outlet line coupled to said low valve, said 3rd clutch outlet line intersecting a 3rd accumulator line, said method further including the step of providing an orifice in said 3rd accumulator line having a diameter in the range of between 0.110 inches–0.116 inches.

16. In an hydraulic circuit for an automotive transmission of the type including a governor, and a manual valve coupled to a gear selector, the improvement comprising:

a low valve in fluid flow relationship with said manual valve such that said low valve is actuated by low oil pressure flowing from said manual valve when said manual valve is moved into a first gear selector position, and means for coupling said low valve in fluid flow relationship to said governor, said means for coupling including at least one passageway disposed between said low valve and said governor for directly coupling said low valve and said governor in fluid flow relationship.

17. The improvement as claimed in claim 16 wherein an opening is defined in said low valve for exhausting fluid pressure from said governor.

18. The improvement as claimed in claim 17 further including means for exerting a resilient force on said governor for moving said governor into a substantially full opened position.

19. The improvement as claimed in claim 17 including orifice means at an inlet to said governor to reduce fluid flow into said low valve through said manual valve to reduce the quantity of fluid exhausted through said opening defined in said low valve.

20. In a hydraulic circuit for an automotive transmission of the type including a governor, and a manual valve coupled to a gear selector, the improvement comprising:

a low valve in fluid flow relationship with said manual valve such that said low valve is actuated by low oil pressure flowing from said manual valve when said manual valve is moved into a first gear selector position, means for coupling said low valve in fluid flow relationship to said governor, and said low valve defining an opening therein for exhausting fluid pressure from said governor.

21. The improvement as claimed in claim 20 including orifice means at an inlet to said governor to reduce fluid flow into said low valve through said manual valve to reduce the quantity of fluid exhausted through said opening defined in said low valve.

* * * * *